US012753298B2

(12) United States Patent
Ye et al.

(10) Patent No.: US 12,753,298 B2
(45) Date of Patent: Oct. 6, 2026

(54) DISENTANGLED PVDF FOR HIGH ELECTROMECHANICAL EFFICIENCY THIN FILMS AND FIBERS

(71) Applicant: Meta Platforms Technologies, LLC, Menlo Park, CA (US)

(72) Inventors: Sheng Ye, Redmond, WA (US); Abhirup Dutta, Storrs Mansfield, CT (US); Hao Mei, Redmond, WA (US); Lafe Joseph Purvis, II, Redmond, WA (US); Arman Boromand, Issaquah, WA (US); Jing Chen, Redmond, WA (US); Andrew John Ouderkirk, Kirkland, WA (US); Kristy Alana Jost, Woodinville, WA (US)

(73) Assignee: Meta Platforms Technologies, LLC, Menlo Park, CA (US)

( * ) Notice: Subject to any disclaimer, the term of this patent is extended or adjusted under 35 U.S.C. 154(b) by 538 days.

(21) Appl. No.: 18/454,499

(22) Filed: Aug. 23, 2023

(65) Prior Publication Data

US 2024/0240007 A1 Jul. 18, 2024

Related U.S. Application Data

(60) Provisional application No. 63/480,126, filed on Jan. 17, 2023.

(51) Int. Cl.
*C08L 27/16* (2006.01)
*B29C 71/00* (2006.01)
(Continued)

(52) U.S. Cl.
CPC .......... *C08L 27/16* (2013.01); *B29C 71/0081* (2013.01); *B29C 71/02* (2013.01); *B29C 2071/022* (2013.01); *B29K 2027/16* (2013.01)

(58) Field of Classification Search
CPC ..... C08L 27/16; B29C 71/0081; B29C 71/02; B29C 2071/022; B29K 2027/16
See application file for complete search history.

(56) References Cited

U.S. PATENT DOCUMENTS

| | | | | |
|---|---|---|---|---|
| 2008/0203619 | A1* | 8/2008 | Lanceros-Mendez | C08J 5/18 264/435 |
| 2022/0348730 | A1 | 11/2022 | Ye et al. | |

FOREIGN PATENT DOCUMENTS

| | | | |
|---|---|---|---|
| EP | 0703266 | A1 | 3/1996 |
| WO | 2022232674 | A1 | 11/2022 |

OTHER PUBLICATIONS

International Search Report and Written Opinion for International Application No. PCT/US2023/085067, mailed Apr. 30, 2024, 16 pages.

(Continued)

*Primary Examiner* — Shane Fang
(74) *Attorney, Agent, or Firm* — McDermott Will & Schulte LLP

(57) ABSTRACT

A polymer article includes an at least partially disentangled polyvinylidene fluoride (PVDF) family member composition and is characterized by an elastic modulus of at least 4 GPa and an electromechanical coupling factor ($k_{31}$) of at least 0.1 at room temperature. A method of manufacturing such a polymer article may include forming an at least partially disentangled polymer composition into a polymer thin film or fiber, applying a tensile stress to the polymer article in an amount effective to induce a stretch ratio of at least approximately 5 in the thin film or fiber, and applying an electric field across a thickness dimension of the polymer article. Annealing and poling steps may separately or simultaneously accompany and/or follow the act of stretching.

12 Claims, 11 Drawing Sheets

(51) Int. Cl.
*B29C 71/02* (2006.01)
*B29K 27/00* (2006.01)

(56) References Cited

OTHER PUBLICATIONS

Ohigashi H., et al., "Formation of "Single Crystalline Films" of Ferroelectric Copolymers of Vinylidene Fluoride and Trifluoroethylene," Applied Physics Letters, American Institute of Physics, vol. 66, No. 24, Jun. 12, 1995, pp. 3281-3283.

* cited by examiner

| Procedure | Initiator | Cat. | Solvent | [VDF]/[init.]/[cat] | Temp | Time, h | Conversion | $M_n$, GPC | $M_w$, GPC | % Crystallinity |
|---|---|---|---|---|---|---|---|---|---|---|
| Ex.1 | PFBI | $Mn_2(CO)_{10}$ | DMC | 500/1/0.4 | 35°C | 16 | 18.5% | 41943 | 67109 | 63% |
| Ex.2 | DIPFB | $Mn_2(CO)_{10}$ | DMC | 2000/1/2.1 | 35°C | 22 | 6.0% | 99453 | 159124 | 69% |

*FIG. 2*

DISENTANGLED PVDF FOR HIGH ELECTROMECHANICAL EFFICIENCY THIN FILMS AND FIBERS

CROSS-REFERENCE TO RELATED APPLICATION

This application claims the benefit of priority under 35 U.S.C. § 119(e) of U.S. Provisional Application No. 63/480,126, filed Jan. 17, 2023, the contents of which are incorporated herein by reference in their entirety.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

FIG. 2 is a table summarizing exemplary synthesis routes for forming disentangled PVDF according to certain embodiments.

Figure 1:
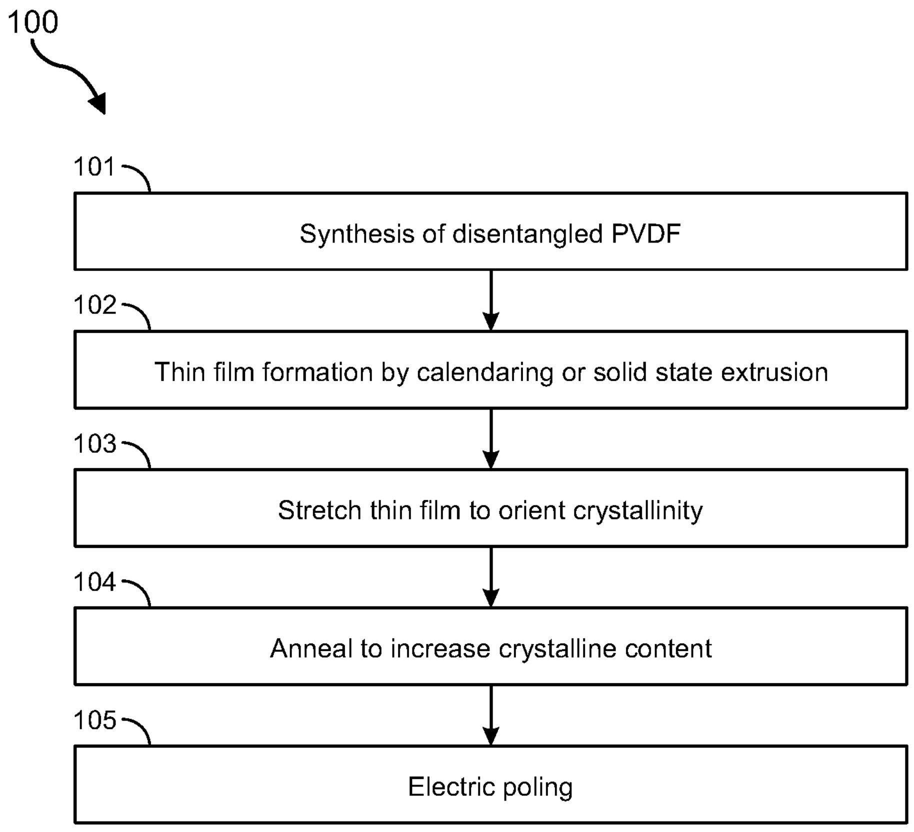
FIG. 1 is a flowchart outlining an example method for forming a polymer thin film having high electromechanical efficiency according to some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

Polymer materials may be incorporated into a variety of different optic and electro-optic systems, including passive and active optics and electroactive devices. Lightweight and conformable, one or more polymer layers may be incorporated into wearable devices such as smart glasses and are attractive candidates for emerging technologies including virtual reality/augmented reality devices where a comfortable, adjustable form factor is desired.

Virtual reality (VR) and augmented reality (AR) eyewear devices and headsets, for instance, may enable users to experience events, such as interactions with people in a computer-generated simulation of a three-dimensional world or viewing data superimposed on a real-world view. By way of example, superimposing information onto a field of view may be achieved through an optical head-mounted display (OHMD) or by using embedded wireless glasses with a transparent heads-up display (HUD) or augmented reality (AR) overlay. VR/AR eyewear devices and headsets may be used for a variety of purposes. Governments may use such devices for military training, medical professionals may use such devices to simulate surgery, and engineers may use such devices as design visualization aids.

These and other applications may leverage one or more characteristics of polymer materials, including the refractive index to manipulate light, thermal conductivity to manage heat, and mechanical strength and toughness to provide light-weight structural support. The degree of optical or mechanical anisotropy achievable through comparative thin film manufacturing processes is typically limited, however, and is often exchanged for competing thin film properties such as flatness, toughness, and/or film strength. For example, highly anisotropic polymer thin films often exhibit low strength in one or more in-plane direction, which may challenge manufacturability and limit throughput.

According to some embodiments, oriented piezoelectric polymer thin films may be implemented as an actuatable lens substrate in an optical element such as a liquid lens. Uniaxially-oriented polyvinylidene fluoride (PVDF) thin films, for example, may be used to generate an advantageously anisotropic strain map across the field of view of a lens. Oriented piezoelectric polymer fibers may be knit, woven or otherwise amassed to form an oriented piezoelectric polymer thin film. However, low piezoelectric response, insufficient mechanical strength or toughness, and/or a lack of adequate optical quality may impede the implementation of PVDF thin films as an actuatable layer.

Notwithstanding recent developments, it would be advantageous to provide optical quality, mechanically robust, and mechanically and piezoelectrically anisotropic polymer thin films that may be incorporated into various optical systems including display systems for artificial reality applications. The instant disclosure is thus directed generally to high modulus, high strength, and optical quality polymer thin films and fibers having a high and efficient piezoelectric response as well as their methods of manufacture, and more specifically to extruding/calendaring, stretching, annealing, and poling methods for forming mechanically stable PVDF-based polymer thin films and fibers having a high electromechanical efficiency. A higher modulus may allow greater forces to be generated in the polymer, which may enable thinner, lighter weight, and more efficient devices (e.g., for converting mechanical energy into electrical energy or vice versa).

The piezoelectric response of a polymer material may be determined by its chemical composition, the chemical structure of the polymer repeat unit, its density and extent of crystallinity, as well as the alignment of the crystals and/or polymer chains. Among these factors, the crystal or polymer chain alignment may dominate. In crystalline or semi-crystalline polymer thin films and fibers, the piezoelectric response may be correlated to the degree or extent of crystal orientation, whereas the degree or extent of chain alignment may create comparable piezoelectric response in amorphous polymers.

An applied stress may be used to create a preferred alignment of crystals or polymer chains within a polymer and induce a corresponding modification of the piezoelectric response along different directions. As disclosed further herein, during processing where a polymer article is stretched to induce a preferred alignment of crystals/polymer chains and an attendant modification of the piezoelectric response, Applicants have shown that the choice of the initial polymer composition and microstructure can decrease the propensity for polymer chain entanglement within the article. In particular embodiments, control of the relative rates of crystallization and polymerization during the synthesis of PVDF family polymers may contribute advantageously to lowering the degree of polymer chain entanglement, which may improve polymer chain alignment during a subsequent act of stretching and polymer chain alignment. In some embodiments, the evolution of the modulus and the piezoelectric response in PVDF family polymers may be enhanced by thermal annealing, which may accompany and/or follow the act of stretching.

Disclosed are piezoelectric polymers and methods of manufacturing piezoelectric polymer thin films and fibers that exhibit an elevated modulus along at least one direction and an accompanying enhancement in their piezoelectric response. The piezoelectric response may be improved by stretching the polymer material to a very high stretch ratio, which may unfold elastic lamellar polymer crystals and reorient crystallites and/or polymer chains within the polymer matrix.

For many low molecular weight polymers, a requisite degree of stretching typically causes fracture or voiding that may compromise optical quality and mechanical integrity. In addition, chain entanglement and high viscosity characteristic of high molecular weight polymers may limit their processability. Moreover, high stretch ratios may limit the maximum achievable thickness in stretched thin films.

In accordance with particular embodiments, disclosed are polymer thin film manufacturing methods for forming an optical quality and mechanically robust PVDF-based polymer article having a desired piezoelectric response. Whereas in comparative PVDF and related polymer systems, the total extent of crystallization as well as the alignment of crystals may be limited due to polymer chain entanglement, an extruding/calendering, stretching, annealing, and poling method using a disentangled polymer composition may lead to improvements in the optical quality and mechanical toughness of a polymer article as well as improvements in its piezoelectric efficiency and response.

Entanglement may refer to the physical crosslinking of polymer chains within a polymer system. Polymer chain entanglement may limit the deformability of polymer films/fibers during an act of stretching and crystal orientation. In accordance with the various methods disclosed herein, an at least partially disentangled polymer resin may be synthesized using controlled radical polymerization reactions, and the resulting (at least partially) disentangled polymer resin may be processed by either solid state extrusion or calendering to form disentangled polymer thin films and fibers.

As used herein, and in accordance with various embodiments, an at least partially disentangled polymer, e.g., a disentangled polymer such as PVDF, exhibits a differential scanning calorimetry (DSC) melting peak (endotherm) and a non-equilibrium melting peak at low scanning rates, i.e., heating rates of approximately 5° C./min or less (5° C./min, 2° C./min, or 1° C./min, including ranges between any of the foregoing values). The non-equilibrium melting peak may be located approximately 5 to 15° C. higher than the melting peak. Entangled PVDF, on the other hand, typically exhibits only a single melting endotherm or a split melting peak where a secondary peak is approximately 2 to 3° C. from the primary peak.

According to some embodiments, PVDF-based polymer thin films and fibers may be formed using a crystallizable polymer. Example crystallizable polymers may include moieties such as vinylidene fluoride (VDF), trifluoroethylene (TrFE), chlorotrifluoroethylene (CTFE), hexafluoropropene (HFP), and vinyl fluoride (VF).

According to various embodiments, a polymer thin film or fiber may include one or more of the foregoing moieties, as well as their homopolymers, co-polymers, tri-polymers, derivatives, and mixtures thereof. According to some embodiments, one or more of the foregoing "PVDF family" moieties may be combined with a liquid solvent and one or more additives and processed to form a piezoelectric polymer article. As used herein, reference to a PVDF thin film or fiber includes reference to any PVDF family member-containing polymer thin film or fiber unless the context clearly indicates otherwise.

A PVDF family polymer may have a molecular weight ("high molecular weight") of at least approximately 100,000 g/mol, e.g., at least approximately 100,000 g/mol, at least approximately 150,000 g/mol, at least approximately 200,000 g/mol, at least approximately 250,000 g/mol, at least approximately 300,000 g/mol, at least approximately 350,000 g/mol, at least approximately 400,000 g/mol, at least approximately 450,000 g/mol, or at least approximately 500,000 g/mol, including ranges between any of the foregoing values.

A method may include forming a disentangled polymer composition, shaping the disentangled polymer composition into a polymer article, applying a tensile stress to the polymer article, and applying an electric field across a dimension of the polymer article.

Example polymer articles include thin films and fibers, although further form factors are contemplated. The disentangled polymer composition may include a disentangled polymer resin, one or more additives, and a liquid solvent. In some embodiments, the tensile stress may be applied in an amount effective to induce a stretch ratio of at least approximately 5 in the polymer article. An annealing step may be introduced to thermally stabilize the polymer composition and/or increase the crystalline content within the polymer matrix.

In certain examples, the molecular weight distribution for the disentangled polymer resin may be mono-disperse, bimodal, tri-modal, or polydisperse. For instance, a polymer having a bimodal molecular weight distribution may be characterized by two molecular weight distribution maxima, one in a low(er) molecular weight region and one in a high(er) molecular weight region.

The polydispersity (or heterogeneity index) is a measure of the broadness of a molecular weight distribution of a polymer and may be used to characterize a polymer composition. The polydispersity index (PDI) may be calculated as the ratio of weight average molecular weight ($M_w$) to number average molecular weight ($M_n$) of a polymer sample, i.e., PDI=$M_w/M_n$. In accordance with certain embodiments, a polydispersity index for a disentangled or at least partially disentangled PVDF polymer composition may be at least approximately 1.5, e.g., approximately 1.5, approximately 2, approximately 2.5, or approximately 3 or more, including ranges between any of the foregoing values.

A polymer thin film or fiber may be formed by solid state extrusion or calendering of a suitable polymer mixture. A polymer mixture may include one or more high molecular weight polymers, one or more additives, and one or more liquid solvents.

In some embodiments, an additive may include a nucleation agent. The content of a nucleation agent, if provided, may be up to approximately 20 wt. % of a polymer mixture, e.g., 0.5, 1, 2, 4, 10, or 20 wt. %, including ranges between any of the foregoing values.

Suitable liquid solvents may include a chemical compound or mixture of chemical compounds that can at least partially dissolve or substantially swell the polymer, oligomer, and monomer constituent(s). In some embodiments, a liquid solvent may have a vapor pressure of at least approximately 10 mTorr at 100° C.

The liquid solvent (i.e., "solvent") may include a single solvent compound or a mixture of different solvents. In some embodiments, the solubility of the crystallizable polymer in the liquid solvent may be at least approximately 0.1 g/100 g (e.g., 1 g/100 g or 10 g/100 g) at a temperature of approximately 25° C. or more (e.g., 50° C., 75° C., 100° C., or 150° C., including ranges between any of the foregoing values). The choice of solvent may affect the maximum crystallinity and percent beta phase content of a PVDF-based polymer article, which may impact its modulus and/or piezoelectric response. In addition, the polarity of the solvent may impact the critical polymer concentration for polymer chains to entangle in solution.

Example solvents include, but are not limited to, dimethyl carbonate (DMC), dimethylformamide (DMF), cyclohexanone, dimethylacetamide (DMAc), diacetone alcohol, di-isobutyl ketone, tetramethyl urea, 1,1,1,3,3-pentafluorobutane, ethyl acetoacetate, dimethyl sulfoxide (DMSO), trimethyl phosphate, N-methyl-2-pyrrolidone (NMP), butyrolactone, isophorone, triethyl phosphate, carbitol acetate, propylene carbonate, glyceryl triacetate, dimethyl phthalate, acetone, tetrahydrofuran (THF), methyl ethyl ketone, methyl isobutyl ketone, glycol ethers, glycol ether esters, and N-butyl acetate. Exemplary solvents include theta solvents.

According to some embodiments, a method of manufacturing a piezoelectric polymer article may include extruding a polymer solution or flowable mixture through an orifice to form an extruded polymer article, and subsequently stretching and heating the cast polymer article. An extrusion method may provide control of one or more of the solvent, polymer concentration, and forming temperature, for example, and may facilitate decreased entanglement of polymer chains and allow the polymer thin film or fiber to achieve a higher stretch ratio during a subsequent deformation step.

According to some examples, a solid state extrusion process may be used to orient the polymer chains. According to further examples, a calendering process may be used to orient polymer chains at room temperature or at elevated temperature. The liquid solvent may be partially or fully removed before, during, or after stretching and orienting.

In an example process, a dried or substantially dried polymer material may be hot pressed to form a desired shape that is fed through a solid state extrusion system (i.e., extruder) at a suitable extrusion temperature. A solid state extruder may include a bifurcated nozzle, for example. The temperature for hot pressing and the extrusion temperature may each be less than approximately 190° C. That is, the hot pressing temperature and the extrusion temperature may be independently selected from 180° C., 170° C., 160° C., 150° C., 130° C., 110° C., 90° C., or 80° C., including ranges between any of the foregoing values. According to particular embodiments, the extruded polymer material may be stretched further, e.g., using a post-extrusion, uniaxial, or biaxial stretch process.

A polymer thin film may be formed using a thin film orientation system configured to heat and stretch a polymer thin film in at least one in-plane direction in one or more distinct regions thereof. In some embodiments, a thin film orientation system may be configured to stretch a polymer thin film, i.e., a crystallizable polymer thin film, along only one in-plane direction. For instance, a thin film orientation system may be configured to apply an in-plane stress to a polymer thin film along the x-direction while allowing the thin film to relax along an orthogonal in-plane direction (i.e., along the y-direction). The relaxation of a polymer thin film may, in certain examples, accompany the absence of an applied stress along a relaxation direction. The application of stress and the realized strain may orient the crystalline content within the polymer thin film along a preferred direction.

In some embodiments, during and/or following stretching, the polymer article may be annealed. Annealing may be performed at a fixed or variable stretch ratio and/or a fixed or variable applied stress. In some embodiments, a polymer thin film or fiber may be annealed while under an applied real stress of at least approximately 100 MPa. The annealing temperature may be fixed or variable. A variable annealing temperature, for instance, may increase from an initial annealing temperature to a final annealing temperature. The annealing temperature may be greater than the polymer's glass transition temperature ($T_g$) and, in certain examples, may be less than, substantially equal to, or greater than the temperature corresponding to the onset of melting for the polymer ($T_m$). An example annealing temperature may be greater than approximately 80° C., e.g., 100° C., 130° C., or 170° C., including ranges between any of the foregoing values. Without wishing to be bound by theory, annealing may stabilize the orientation of polymer chains and decrease the propensity for shrinkage of the polymer article.

Annealing may include a single step process (i.e., at a single temperature) or a multi-step process. Multi-step annealing may include heating a polymer article to successively greater temperatures. During a multi-step anneal, smaller crystals may melt and recrystallize as larger crystals. With such a process, smaller and medium sized crystals may be reformed as larger crystals, which may result in a higher modulus following multiple annealing steps.

Stretching a PVDF family thin film or fiber may form both alpha and beta phase PVDF crystals, although only aligned beta phase crystals contribute to piezoelectric response. During and/or after a stretching process, and during and/or after an annealing process, an electric field may be applied to the polymer article. The application of an electric field (i.e., poling) may induce the formation and alignment of beta phase crystals. Without wishing to be bound by theory, whereas a lower electric field (<50 V/micrometer) may be applied to align beta phase crystals, a higher electric field (≥50 V/micrometer) can be applied to both induce a phase transformation from the alpha phase to the beta phase and encourage alignment of the beta phase crystals. According to some embodiments, the act of poling may accompany and/or follow stretching. According to some embodiments, the act of poling may accompany and/or following annealing.

Following deformation, the crystals or chains may be at least partially aligned with the direction of the applied tensile stress. As such, a polymer thin film, for example, may exhibit a high degree of optical clarity, bulk haze of less than approximately 10%, an elastic modulus along an in-plane dimension of at least approximately 4 GPa, a high piezoelectric coefficient (e.g., $d_{31}$ greater than approximately 5 pC/N) and/or a high electromechanical coupling factor (e.g., $k_{31}$ greater than approximately 0.2).

By way of example, an oriented polymer thin film may have an in-plane modulus greater than approximately 4 GPa, e.g., 4, 5, 10, 12, or 15 GPa, including ranges between any of the foregoing values, and a piezoelectric coefficient ($d_{31}$) greater than 5 pC/N, e.g., 5, 10, 15, or 20 pC/N, including ranges between any of the foregoing values. High piezoelectric performance may be associated with the creation and alignment of beta phase crystals in PVDF family polymers.

Further to the foregoing, an electromechanical coupling factor $k_{ij}$ may indicate the effectiveness with which a piezoelectric material can convert electrical energy into mechanical energy, or vice versa. For a polymer thin film, the electromechanical coupling factor $k_{31}$ may be expressed as $$k_{31} = \frac{d31}{\sqrt{e33 * s31}},$$

where $d_{31}$ is the piezoelectric strain coefficient, $e_{33}$ is the dielectric permittivity in the thickness direction, and $s_{31}$ is the compliance in the machine direction. Higher values of $k_{31}$ may be achieved by disentangling polymer chains prior to stretching and promoting dipole moment alignment within a crystalline phase (e.g., the beta phase in PVDF family member polymers). In some embodiments, a polymer thin film may be characterized by an electromechanical coupling factor $k_{31}$ at room temperature of at least approximately 0.1, e.g., 0.1, 0.2, 0.3, or more, including ranges between any of the foregoing values.

In accordance with various embodiments, anisotropic polymer articles may include amorphous polymer, aligned amorphous polymer, partially crystalline, or wholly crystalline materials. Such materials may also be mechanically anisotropic, where one or more characteristics selected from compressive strength, tensile strength, shear strength, yield strength, stiffness, hardness, toughness, ductility, machinability, thermal expansion, piezoelectric response, and creep behavior may be directionally dependent.

The crystalline content of a piezoelectric polymer thin film may include crystals of poly(vinylidene fluoride), poly (trifluoroethylene), poly(chlorotrifluoroethylene), poly (hexafluoropropene), and/or poly(vinyl fluoride), for example, although further crystalline polymer materials are contemplated, where a crystalline phase in a "crystalline" or "semi-crystalline" polymer thin film may, in some examples, constitute at least approximately 1% of the polymer article. For instance, the total beta phase content of a polymer article may be at least approximately 30%, e.g., 30, 40, 50, 60, 70, or 80%, including ranges between any of the foregoing values.

A piezoelectric polymer article such as a polymer thin film may, in some embodiments, have an elastic modulus along at least one in-plane direction (e.g., length or width) of at least approximately 4 GPa (e.g., 4 GPa, 10 GPa, 20 GPa, or 30 GPa or more, including ranges between any of the foregoing values). In some embodiments, a piezoelectric polymer thin film may have an elastic modulus along each of a pair of in-plane directions (e.g., length and width) that may independently be at least approximately 4 GPa (e.g., 4 GPa, 10 GPa, 20 GPa, or 30 GPa or more, including ranges between any of the foregoing values). A piezoelectric polymer thin film may be characterized by a piezoelectric coefficient along at least one direction of at least approximately 5 pC/N (e.g., 5 pC/N, 10 pC/N, 20 pC/N, 30 pC/N, or 40 pC/N or more, including ranges between any of the foregoing values).

In PVDF materials, a higher beta ratio may lead to a higher piezoelectric coefficient ($d_{31}$) and higher electromechanical coupling efficiency ($k_{31}$). The effect of composition on crystalline content (e.g., beta phase content) was evaluated for low and high molecular weight PVDF homopolymer resins following thin film formation and stretching/annealing of the thin films. As used herein, Composition A corresponds to a low viscosity (low molecular weight) PVDF homopolymer resin, and Composition B corresponds to a high viscosity (high molecular weight) PVDF homopolymer resin. The resins were tested independently and as mixtures that may be characterized by a bimodal molecular weight distribution. The sample descriptions and crystallization data are summarized in Table 1.

TABLE 1

Effect of Composition on Crystallinity in PVDF Thin Films

| Sample | #1 | #2 | #3 | #4 | #5 | Control |
|---|---|---|---|---|---|---|
| Amount A polymer, (balance B polymer) [%] | 0 | 50 | 60 | 70 | 100 | Commercial PVDF |
| Total crystallinity [%] | 70 | 69 | 84 | 84 | 81 | 52 |
| Beta ratio [%] | 91 | 90 | 92 | 90 | 82 | 64 |
| Total beta phase content [%] | 64 | 62 | 77 | 75 | 66 | 33 |
| Modulus [GPa] | 5.1 | 6.9 | 7.8 | 7.1 | 7.7 | 2.3 |
| Final stretch ratio | 9.9 | 11.6 | 11.1 | 10.6 | 12.6 | N/A |

The respective Compositions A and B (Samples 1 and 5) as well as mixtures thereof (Samples 2-4) were formed into thin films having a thickness of approximately 100 micrometers. The polymer thin films were than heated and stretched prior to measuring crystalline content. After heating the thin film samples to approximately 160° C., the thin films were stretched by applying a tensile stress that increased to a maximum of approximately 200 MPa. The thin films were drawn to a stretch ratio of approximately 9. Thereafter, while maintaining a constant applied stress (200 MPa), each thin film sample was annealed at approximately 160° C. for 20 min, heated at a ramp rate of 0.4° C./min to approximately 180° C. and annealed at approximately 180° C. for 30 min, and then heated at a ramp rate of 0.4° C./min to approximately 186° C. and annealed at approximately 186° C. for an additional 30 min. The samples were then cooled to below 35° C. under a constant applied stress of 200 MPa, and then the stress was removed.

After cooling, the total crystalline content was measured using differential scanning calorimetry (DSC), and the beta ratio was determined using Fourier Transform Infrared Spectroscopy (FTIR). As used herein, "beta ratio" refers to relative content of beta phase PVDF amongst the total crystalline content. The total beta phase content was calculated as the product of the total crystallinity and the beta ratio. The data indicate that the total beta phase content in the polymer thin films having a bimodal molecular weight distribution (Samples 2-4) may be greater than that in polymer thin films having a unimodal molecular weight distribution (Samples 1 and 5).

In some embodiments, a polymer article may have a total crystalline content of at least approximately 40%, e.g., at least approximately 40%, at least approximately 50%, at least approximately 60%, at least approximately 70%, at least approximately 80%, or at least approximately 90%, including ranges between any of the foregoing values. In some embodiments, a polymer thin film may have a beta ratio of at least approximately 70%, e.g., at least approximately 80%, at least approximately 85%, at least approximately 90%, or at least approximately 95%, including ranges between any of the foregoing values. In some embodiments, a polymer thin film may have a total beta phase content of at least approximately 30%, e.g., at least approximately 30%, at least approximately 40%, at least approximately 50%, at least approximately 60%, at least approximately 70%, or at least approximately 80%, including ranges between any of the foregoing values.

According to a further embodiment where the polymer thin films (e.g., Samples 1-5) are heated and stretched prior to measuring crystalline content, after heating the thin film samples to 160° C.±10° C., the thin films may be stretched by applying a tensile stress that is increased to a maximum of approximately 200 MPa. The thin films may be drawn to a stretch ratio of approximately 9. Thereafter, while maintaining a constant applied stress (200 MPa), each thin film sample may be annealed at 160° C.±10° C. for 20 min, heated at a ramp rate of 0.4° C./min to 180° C.±10° C. and annealed at 180° C.±10° C. for 30 min, and then heated at a ramp rate of 0.4° C./min to 186° C.±10° C. and annealed at 186° C.±10° C. for an additional 30 min. The samples may then be cooled to below 35° C. under a constant applied stress 200 MPa stress, and the stress removed.

The presently disclosed anisotropic PVDF-based polymer thin films may be characterized as optical quality polymer thin films and may form, or be incorporated into, an optical element as an actuatable layer. Optical elements may be used in various display devices, such as virtual reality (VR) and augmented reality (AR) glasses and headsets. The efficiency of these and other optical elements may depend on the degree of optical clarity and/or piezoelectric response.

According to various embodiments, an "optical quality thin film" or an "optical quality polymer thin film" may, in some examples, be characterized by a transmissivity within the visible light spectrum of at least approximately 20%, e.g., 20, 30, 40, 50, 60, 70, 80, 90, or 95%, including ranges between any of the foregoing values, and less than approximately 10% bulk haze, e.g., 0, 1, 2, 4, 6, or 8% bulk haze, including ranges between any of the foregoing values.

In further embodiments, an optical quality PVDF-based polymer thin film may be incorporated into a multilayer structure, such as the "A" layer in an ABAB multilayer. Further multilayer architectures may include AB, ABA, ABAB, or ABC configurations. Each B layer (and each C layer, if provided) may include a further polymer composition, such as polyethylene. According to some embodiments, the B (and C) layer(s) may be electrically conductive and may include, for example, indium tin oxide (ITO) or poly (3,4-ethylenedioxythiophene).

In a single layer or multilayer architecture, each PVDF family layer may have a thickness ranging from approximately 100 nm to approximately 5 mm, e.g., 100, 200, 500, 1000, 2000, 5000, 10000, 20000, 50000, 100000, 200000, 500000, 1000000, 2000000, or 5000000 nm, including ranges between any of the foregoing values. A multilayer stack may include two or more such layers. In some embodiments, a density of a PVDF layer or thin film may range from approximately 1.7 g/cm$^3$ to approximately 1.9 g/cm$^3$, e.g., 1.7, 1.75, 1.8, 1.85, or 1.9 g/cm$^3$, including ranges between any of the foregoing values.

According to some embodiments, the areal dimensions (i.e., length and width) of a disentangled PVDF family polymer thin film may independently range from approximately 5 cm to approximately 50 cm or more, e.g., 5, 10, 20, 30, 40, or 50 cm or more, including ranges between any of the foregoing values. Example piezoelectric polymer thin films may have areal dimensions of approximately 5 cm×5 cm, 10 cm×10 cm, 20 cm×20 cm, 50 cm×50 cm, 5 cm×10 cm, 10 cm×20 cm, 10 cm×50 cm, etc.

The application of a uniaxial or biaxial stress to a single or multilayer thin film may be used to align polymer chains and/or orient crystals to induce optical and mechanical anisotropy. Such thin films may be used to fabricate anisotropic piezoelectric substrates, high Poisson's ratio thin films, reflective polarizers, and the like, and may be incorporated into unimorph and bimorph actuators, haptic articles (e.g., gloves), AR/VR headsets, AR/VR combiners, or used to provide display brightness enhancement.

As used herein, the terms "polymer thin film" and "polymer layer" may be used interchangeably. Furthermore, reference to a "polymer thin film" or a "polymer layer" may include reference to a "multilayer polymer thin film" unless the context clearly indicates otherwise.

Aspects of the present disclosure thus relate to the formation of a single layer or multilayer polymer thin film having a high piezoelectric response and improved mechanical properties, including strength and toughness. The improved mechanical properties may also include improved dimensional stability and improved compliance in conforming to a surface having compound curvature, such as a lens.

Features from any of the embodiments described herein may be used in combination with one another in accordance with the general principles described herein. These and other embodiments, features, and advantages will be more fully understood upon reading the following detailed description in conjunction with the accompanying drawings and claims.

The following will provide, with reference to FIGS. 1-10, an overview of the manufacture and characterization of disentangled PVDF family member polymer thin films and fibers having high a high piezoelectric coefficient and high modulus, as well as concepts for incorporating such polymers into optical systems. The discussion associated with FIGS. 1-8 relates to example manufacturing paradigms for producing high strength and high modulus piezoelectric polyvinylidene fluoride thin films suitable for a variety of optical, mechanical, and optomechanical applications. The discussion associated with FIGS. 9 and 10 relates to exemplary virtual reality and augmented reality devices that may include one or more piezoelectric polymer thin films.

The manufacture and characterization of PVDF family member polymer thin films and fibers having high a high piezoelectric coefficient and high modulus is described herein with reference to various embodiments. For instance, an example process flow is illustrated in the flowchart of FIG. 1 where method 100 may include the sequential acts of manufacturing a disentangled PVDF resin 101, forming a thin film or fiber from the disentangled resin 102, stretching the thin film or fiber to create a preferred crystalline orientation therein 103, annealing the oriented thin film or fiber 104, and poling 105.

1: Synthesis of Disentangled PVDF

For the PVDF synthesis, a disentangled state may be achieved by controlling the reaction kinetics such that the crystallization rate of the polymer is greater than the polymerization reaction rate. During comparative polymerization reactions, the product polymer chains may have high mobility, which may lead to their entanglement. By controlling the reaction conditions, however, PVDF crystals may be formed during polymerization where the crystallization rate is greater than the polymerization rate such that polymer chain mobility is decreased and the propensity for polymer chain entanglement is diminished.

In accordance with various embodiments, reaction parameters that may be controlled include the monomer composition and concentration, the choice of initiator and catalyst, the solvent, the reaction temperature and time, etc.

An example monomer is vinylidene fluoride (VDF). Example syntheses may include VDF gas dissolved in a suitable solvent. Solvents may include, but are not limited to, dimethyl carbonate (DMC), dimethylformamide (DMF), cyclohexanone, dimethylacetamide (DMAc), diacetone alcohol, di-isobutyl ketone, tetramethyl urea, 1,1,1,3,3-pentafluorobutane, ethyl acetoacetate, dimethyl sulfoxide (DMSO), trimethyl phosphate, N-methyl-2-pyrrolidone (NMP), butyrolactone, isophorone, triethyl phosphate, carbitol acetate, propylene carbonate, glyceryl triacetate, dimethyl phthalate, acetone, tetrahydrofuran (THF), methyl ethyl ketone, methyl isobutyl ketone, glycol ethers, glycol ether esters, and N-butyl acetate. Exemplary solvents include theta solvents. The concentration of VDF gas within the solvent may range from approximately 0.01 g/ml to 10 g/mL, e.g., 0.01, 0.02, 0.05, 0.1, 0.2, 0.5, or 1 g/mL, including ranges between any of the foregoing values.

Example reaction initiators include 1,4-diiodooctafluorobutane (DIPFB), nonafluoro-1-iodobutane (PFBI), tert-butylperoxypivalate (TBPPI), and 2,5-bis(tert-butylperoxy)-2,5-dimethylhexane (DHBP). Example catalysts include $(CO)_nM\text{-}M(CO)_n$ family members, such as dimanganese decacarbonyl ($Mn_2(CO)_{10}$).

A reaction temperature and time may range respectively from approximately −30° C. to approximately 100° C., e.g., −30° C., −20° C., −10° C., 0° C., 10° C., 20° C., 30° C., 40° C., 50° C., 60° C., 70° C., 80° C., 90° C., or 100° C., including ranges between any of the foregoing values, and for at least approximately 1 hr, e.g., 1, 2, 4, 10, 20, 30, or 40 hr, including ranges between any of the foregoing values. Two representative synthesis examples for forming disentangled PVDF resin are described herein.

Example 1

A 35 mL/150 psi glass pressure tube containing a magnetic stir bar is charged with 8.06 μl (0.047 mmol, 1 eq.) of nonafluoro-1-iodobutane ($CF_3(CF_2)_3I$) (PFBI) as an initiator, 7.31 mg (0.019 mmol, 0.4 eq.) or 20.10 mg (0.052 mmol, 1.1 eq.) of dimanganese decacarbonyl ($Mn_2(CO)_{10}$) as a catalyst, and 3 mL of dimethyl carbonate (DMC) as a solvent. The reaction tube is capped with a front seal plunger fitted with FETFE O-rings and a bushing. The capped tube is connected to a Schlenk line and degassed under vacuum with helium refill for 15-20 cycles. The degassed tube is sealed and then submerged in liquid nitrogen to completely freeze contents of the tube. Once frozen, the tube is opened to condense 1.50 g (23.40 mmol, 500 eq.) of monomer (1,1-difluoroethylene) on top of the frozen mixture. The reaction tube is re-capped and degassed under vacuum with helium refill for 15-20 cycles while the reaction mixture is frozen in liquid nitrogen.

The VDF-containing reaction tube is weighed on a balance and the initial weight is noted. The reaction tube is then placed in an oil bath containing silicone oil. A 23W spiral CFL light bulb is placed in direct contact with the reaction tube in the oil bath. The oil bath is stirred and slowly heated up to 35° C. to avoid over pressurization of the reaction tube. The reaction is stopped after 16-17 hours by removing the reaction tube from the oil bath and immediately placing it in liquid nitrogen.

Example 2

A 35 mL/150 psi glass pressure tube containing a magnetic stir bar is charged with 2.15 μL (0.012 mmol, 1 eq.) of 1,4-diiodooctafluorobutane (DIPFB) as an initiator and 9.59 mg (0.025 mmol, 2.1 eq.) of dimanganese decacarbonyl as a catalyst, and 3 ml of dimethyl carbonate as a solvent. The reaction tube is capped with a front seal plunger fitted with FETFE O-rings and a bushing. The capped tube is connected to a Schlenk line and degassed under vacuum with helium refill for 15-20 cycles. The degassed tube is sealed and then submerged in liquid nitrogen to completely freeze contents of the tube. Once frozen, the tube is opened to condense 1.50 g (23.40 mmol, 2000 eq.) of monomer (1,1-difluoroethylene) on top of the frozen mixture. The reaction tube is re-capped and degassed under vacuum with helium refill for 15-20 cycles while the reaction mixture is frozen in liquid nitrogen.

The VDF-containing reaction tube is weighed on a balance and the initial weight is noted. The reaction tube is then placed in an oil bath containing silicone oil. A 23W spiral CFL light bulb is placed in direct contact with the reaction tube in the oil bath. The oil bath is stirred and slowly heated up to 35° C. or 55° C. to avoid over pressurization of the reaction tube. The reaction is stopped after 22 hours by removing the reaction tube from the oil bath and immediately placing it in liquid nitrogen.

A summary of the Example 1 and Example 2 VDF polymerization reactions and corresponding polymer characterization data is shown in FIG. 2.

Figure 3A:
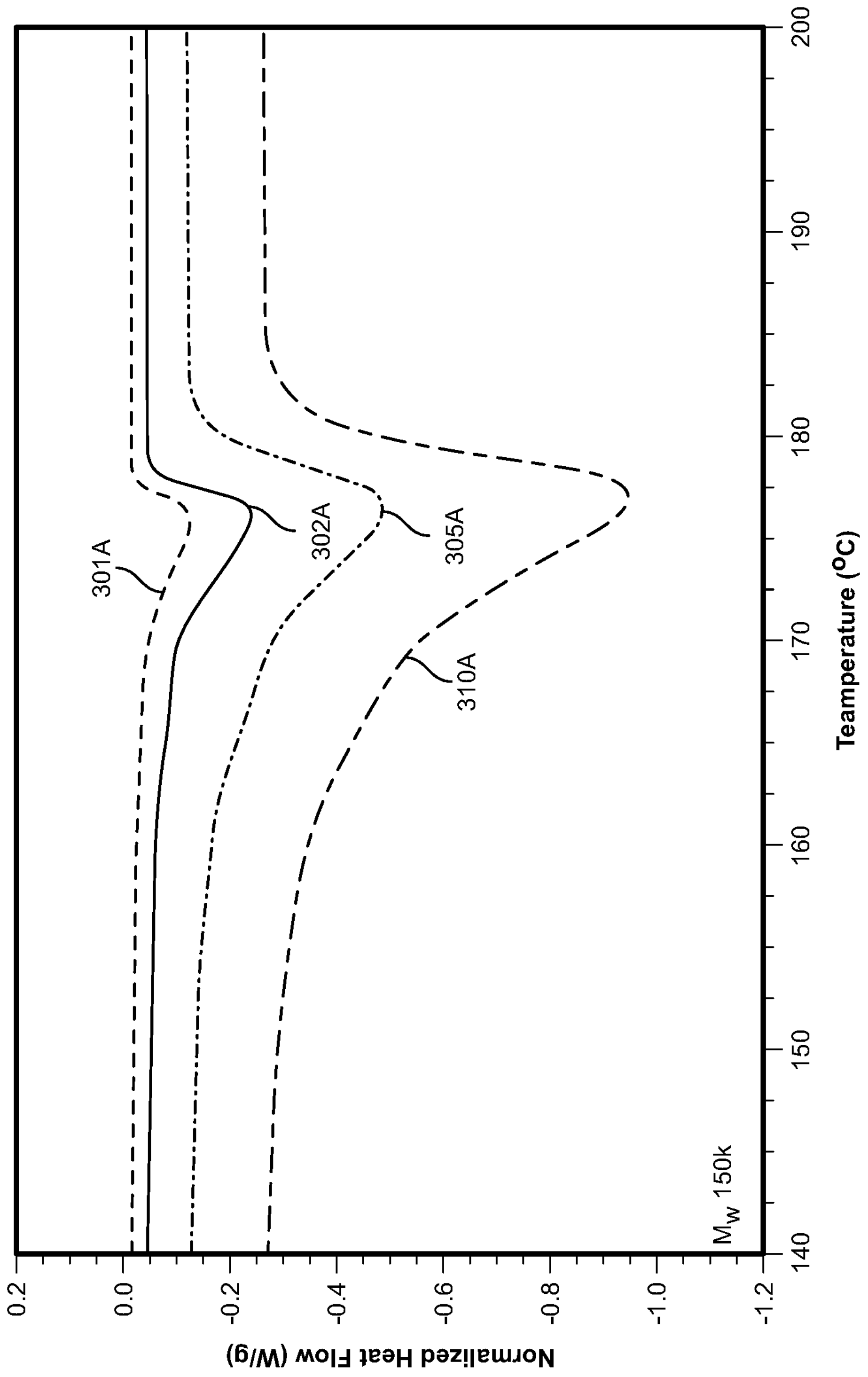
FIGS. 3A and 3B show differential scanning calorimetry endotherms for (A) a comparative PVDF composition, and (B) disentangled PVDF according to some embodiments.

DSC characterization provides evidence of disentanglement within the synthesized polymers. Differential scanning calorimetry (DSC) endotherms associated with comparative and exemplary PVDF compositions are shown in FIG. 3. Data for heating rates of 1° C./min, 2° C./min, 5° C./min, and 10° C./min for a commercially-available PVDF material ($M_n$=88,000, $M_w$=150,000) are depicted respectively in curves 301A, 302A, 305A, and 310A of FIG. 3A, where no change in shape of the melting endotherm is observed. Also, no new peaks are observed at lower heating rates, as expected for highly entangled, high molecular weight polymers.

Figure 3B:
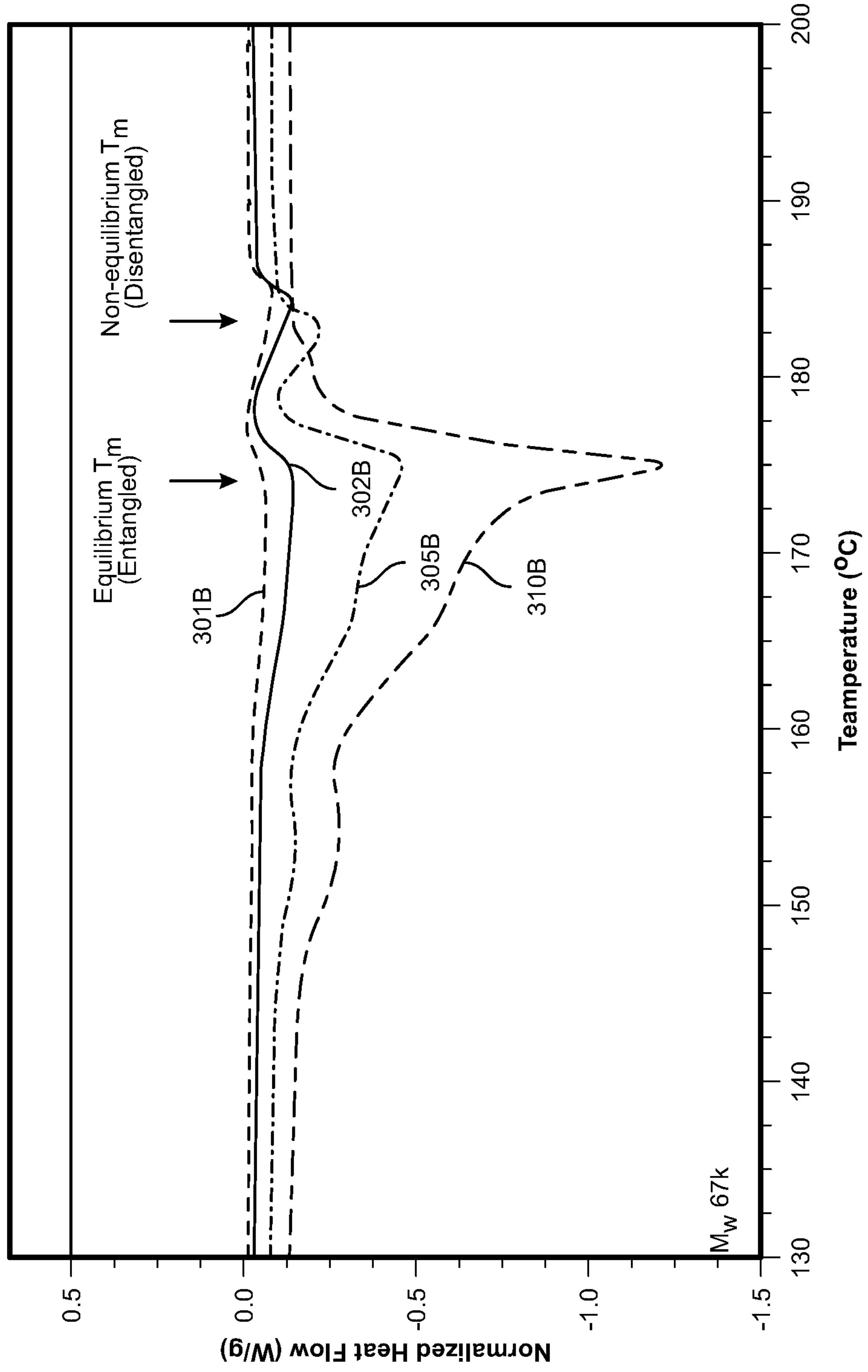

Turning to FIG. 3B, in an analogous characterization of one of the PVDF samples synthesized according to exemplary embodiments, in addition to the endotherms over the range of approximately 170° C. to 180° C., shown are prominent secondary melting peaks over the range of approximately 180° C. to 185° C. The existence of two distinct melting events may be attributed to the co-existence of an equilibrium (entangled) phase and a non-equilibrium (disentangled) phase. In FIG. 3B, the curves 301B, 302B, 305B, and 310B correspond to DSC heating rates of 1° C./min, 2° C./min, 5° C./min, and 10° C./min, respectively.

Without wishing to be bound by theory, slow melting of disentangled ultra-high molecular weight polyethylene (UHMWPE) may encourage the detachment of disentangled chains from the crystalline matrix and subsequent diffusion in the melt. The resulting amorphous phase may exhibit a unique melting endotherm at elevated temperatures relative to the melting peak for the native crystal.

2: Thin Film Formation

Example processes for forming a thin film from disentangled PVDF resin include solid state extrusion and calendering. In either approach, the resin may be heated to a temperature above its glass transition temperature ($T_g$) but below the onset of melting for the polymer ($T_m$). In some approaches, powdered resin may be mixed with a liquid solvent to form a slurry. The choice of liquid solvent may impact the degree of disentanglement of the polymer within the slurry. Example ratios of liquid solvent to solid resin may range from approximately 5:95 to approximately 30:70, e.g., 5:95, 10:90, 20:80, or 30:70, including ranges between any of the foregoing values. In some cases, the slurry may include a poor solvent. A poor solvent may be adapted to dissolve less than 5 g PVDF per 100 g liquid solvent.

Figure 4:
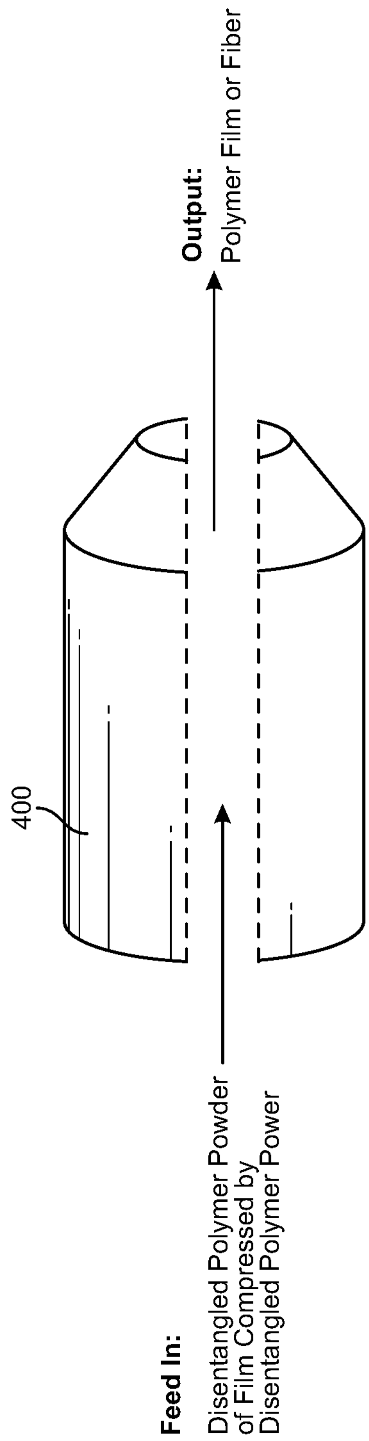
FIG. 4 depicts an example solid state extrusion process for forming a PVDF article according to some embodiments.

Solid state extrusion may be used to orient a disentangled PVDF resin without inducing re-entanglement. Referring to FIG. 4, in some cases, disentangled or partially disentangled polymer resin may be added directly to a solid state extruder 400. In other cases, the disentangled or partially disentangled resin may be compressed at a temperature less than its melting point to create the desired form factor, which may be then transferred into a solid state extruder.

Figure 5:
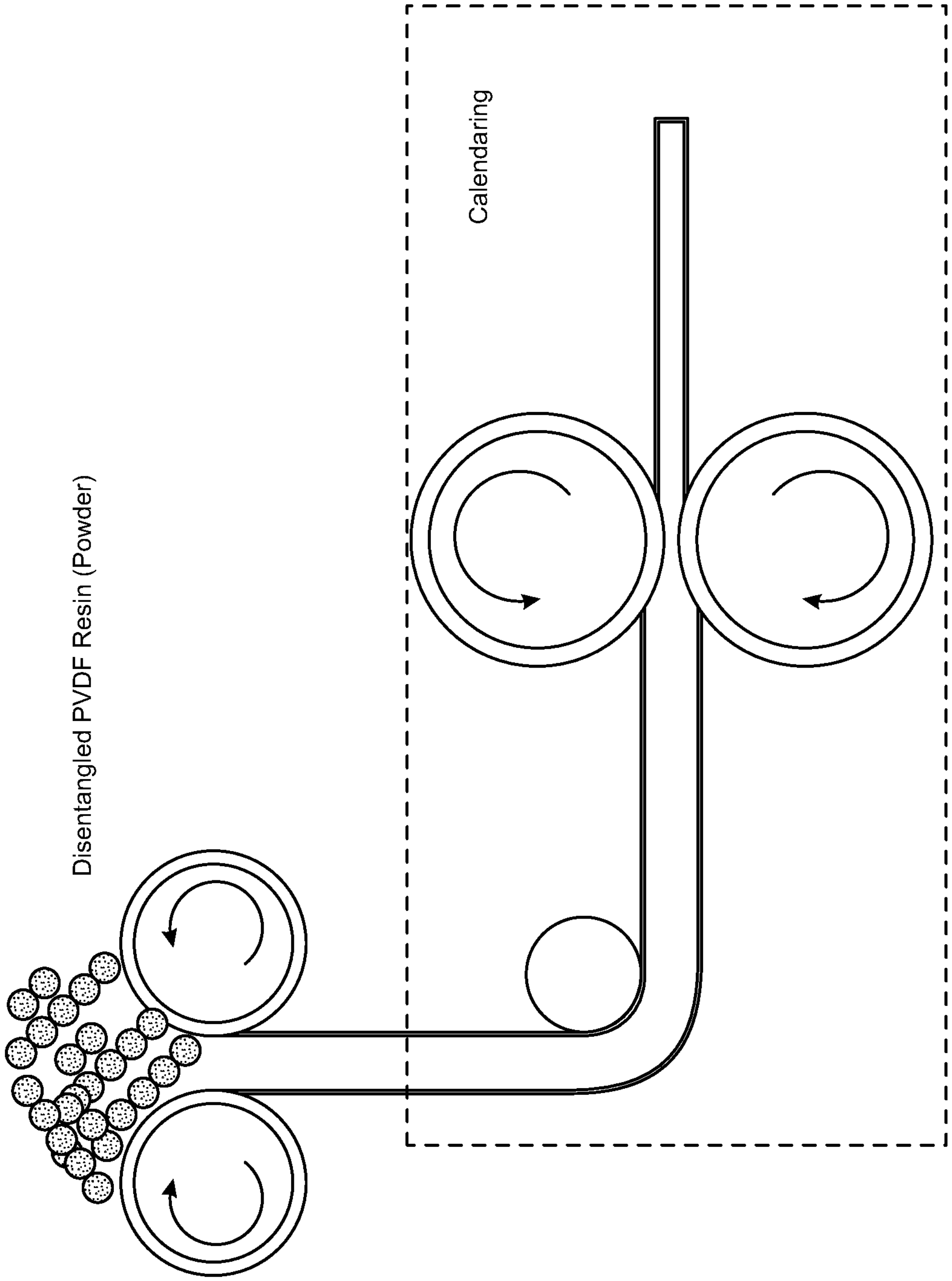
FIG. 5 depicts an example calendering process for forming a PVDF thin film according to some embodiments.

According to further embodiments, a disentangled or partially disentangled polymer resin may be passed between the multiple rollers of a calendering system in a single step or using multiple steps. Referring to FIG. 5, a thin film may be formed by controlling the gap between adjacent heated rollers. In each of one or more calendering steps, the temperature and orientation rate may be independently controlled, which may be used to tune the thickness of a thin film.

3: Fiber Formation

Disentangled PVDF fibers may be formed by solid state extrusion using a process similar to the process for forming a thin film but with an extruder nozzle having a small diameter output. By controlling the extruder nozzle dimensions and the applied pressure within the system, PVDF fibers can be obtained having a desired cross-sectional shape and diameter and stretch ratio. The obtained disentangled PVDF fibers may be stretched, annealed, and poled to achieve target performance. In some cases, a disentangled PVDF fiber may be formed by slicing a calendered thin film.

4: Stretching/Orienting

A stretching process may be used to orient crystals within disentangled thin films and fibers. An anisotropic polymer thin film may be formed using a thin film orientation system configured to heat and stretch a polymer thin film in at least one in-plane direction in one or more distinct regions thereof. In some embodiments, a thin film orientation system may be configured to stretch a polymer thin film, i.e., a crystallizable polymer thin film, along only one in-plane direction. For instance, a thin film orientation system may be configured to apply an in-plane stress to a polymer thin film along the x-direction while allowing the thin film to relax along an orthogonal in-plane direction (i.e., along the y-direction). The relaxation of a polymer thin film may, in certain examples, accompany the absence of an applied stress along a relaxation direction.

According to some embodiments, within an example system, a polymer thin film may be heated and stretched transversely to a direction of film travel through the system. In such embodiments, a polymer thin film may be held along opposing edges by plural movable clips slidably disposed along a diverging track system such that the polymer thin film is stretched in a transverse direction (TD) as it moves along a machine direction (MD) through heating and deformation zones of the thin film orientation system.

According to some embodiments, within an example system, a polymer thin film may be heated and stretched parallel to a direction of film travel through the system. In such embodiments, a polymer thin film may be held along opposing edges by plural movable clips slidably disposed along a converging track system such that the polymer thin film is stretched in a machine direction (MD) as it moves along the machine direction (MD) through heating and deformation zones of the thin film orientation system.

In some embodiments, the stretching rate in the transverse direction and the relaxation rate in the machine direction (or vice versa) may be independently and locally controlled. In some embodiments, the act of stretching may include a constant or changing thin film temperature and/or a constant or changing strain rate. In certain embodiments, large scale production may be enabled using a roll-to-roll manufacturing platform.

In certain aspects, the tensile stress may be applied uniformly or non-uniformly along a lengthwise or widthwise dimension of the polymer thin film. Heating of the polymer thin film may accompany the application of the tensile stress. For instance, a semi-crystalline polymer thin film may be heated to a temperature greater than room temperature (~23° C.) to facilitate deformation of the thin film and the formation and realignment of crystals and/or polymer chains therein.

The temperature of the polymer thin film may be maintained at a desired value or within a desired range before, during and/or after the act of stretching, i.e., within a pre-heating zone or a deformation zone downstream of the pre-heating zone, in order to improve the deformability of the polymer thin film relative to an un-heated polymer thin film. The temperature of the polymer thin film within a deformation zone may be less than, equal to, or greater than the temperature of the polymer thin film within a pre-heating zone.

In some embodiments, the polymer thin film may be heated to a constant temperature throughout the act of stretching. In some embodiments, different regions of the polymer thin film may be heated to different temperatures, i.e., during and/or subsequent to the application of a tensile stress. In certain embodiments, the stretch ratio in response to the applied tensile stress may be at least approximately 1.2, e.g., approximately 1.2, approximately 1.5, approximately 2, approximately 3, approximately 4, approximately 5, approximately 10, approximately 12, approximately 15, or approximately 20 or more, including ranges between any of the foregoing values. A stretch ratio may be calculated as a length of the polymer thin film after stretching divided by the corresponding length before stretching.

In various examples, a modulus of elasticity of the stretched polymer thin film along a stretch direction thereof may be proportional to the stretch ratio. Higher stretch ratios may effectively unfold relatively elastic lamellar polymer crystals and increase the extent of crystal alignment within the resulting piezoelectric polymer thin film.

In some embodiments, the crystalline content within the polymer thin film may increase during the act of stretching. In some embodiments, stretching may alter the orientation of crystals and/or an average crystallite size within a polymer thin film without substantially changing the crystalline content.

A piezoelectric polymer article may be formed by applying a stress to a polymer thin film. In some embodiments, a polymer thin film having a bimodal molecular weight distribution, or a high polydispersity index, may be stretched to a larger stretch ratio than a comparative polymer thin film. In some examples, a stretch ratio may be greater than 4, e.g., 5, 10, 20, 30, 40, or more. The act of stretching may include a single stretching step or plural (i.e., successive) stretching steps where one or more of a stretching temperature and a strain rate may be independently controlled.

An example method of forming a piezoelectric polymer thin film may include uniaxially orienting a cast polymer thin film with a stretch ratio of at least approximately 4, e.g., 5, 10, 20, 30, 40, or more, including ranges between any of the foregoing values). A further example method of forming a piezoelectric polymer thin film may include biaxially orienting a cast polymer thin film with independent stretch ratios along each in-plane direction of at least approximately 4, e.g., 5, 10, 20, 30, 40, or more, including ranges between any of the foregoing values). Biaxial stretching may be performed simultaneously or in successive stretching steps.

In example methods, the polymer thin film may be heated during stretching to a temperature of from approximately 60° C. to approximately 170° C. and stretched at a strain rate of from approximately 0.1%/sec to approximately 300%/sec. Moreover, one or both of the temperature and the strain rate may be held constant or varied during the act of stretching. For instance, in an illustrative but non-limiting example, a polymer thin film may be stretched at a first temperature and a first strain rate (e.g., 130° C. and 50%/sec) to achieve a first stretch ratio. Subsequently, the temperature of the polymer thin film may be increased, and the strain rate may be decreased to a second temperature and a second strain rate (e.g., 165° C. and 5%/sec) to achieve a second stretch ratio.

Following deformation of the polymer thin film or fiber, the heating may be maintained for a predetermined amount of time, followed by cooling. The act of cooling may include allowing the polymer thin film or fiber to cool naturally, at a set cooling rate, or by quenching, such as by purging with a low temperature gas, which may thermally stabilize the polymer article.

In conjunction with various embodiments, a polymer thin film may be described with reference to three mutually orthogonal axes that are aligned with the machine direction (MD), the transverse direction (TD), and the normal direction (ND) of a thin film orientation system, and which may correspond respectively to the length, width, and thickness dimensions of the polymer thin film. Throughout various embodiments and examples of the instant disclosure, the machine direction may correspond to the x-direction of a polymer thin film, the transverse direction may correspond to the y-direction of the polymer thin film, and the normal direction may correspond to the z-direction of the polymer thin film.

Figure 6:
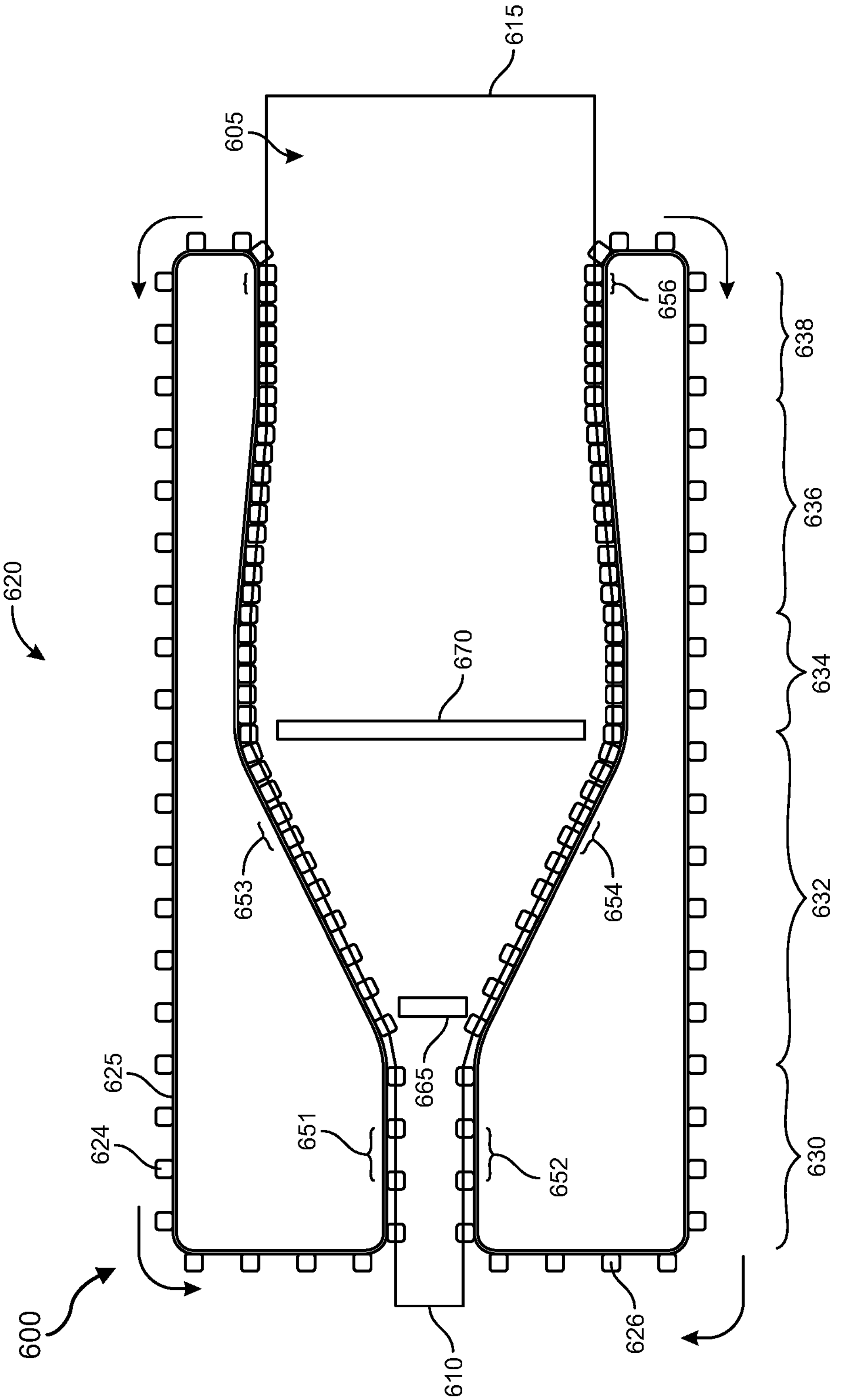
FIG. 6 is a schematic view of a thin film orientation system for manufacturing anisotropic piezoelectric polymer thin films according to some embodiments.

A thin film orientation system for forming an anisotropic piezoelectric polymer thin film is shown schematically in FIG. 6. System 600 may include a thin film input zone 630 for receiving and pre-heating a crystallizable portion 610 of a polymer thin film 605, a thin film output zone 638 for outputting a crystallized and oriented portion 615 of the polymer thin film 605, and a clip array 620 extending between the input zone 630 and the output zone 638 that is configured to grip and guide the polymer thin film 605 through the system 600, i.e., from the input zone 630 to the output zone 638. Clip array 620 may include a plurality of movable first clips 624 that are slidably disposed on a first track 625 and a plurality of movable second clips 626 that are slidably disposed on a second track 627.

Polymer thin film 605 may include a single polymer layer or multiple (e.g., alternating) layers of first and second polymers, such as a multilayer ABAB . . . structure. Alternately, polymer thin film 605 may include a composite architecture having a crystallizable polymer thin film and a high Poisson's ratio polymer thin film directly overlying the crystallizable polymer thin film (not separately shown). In some embodiments, a polymer thin film composite may include a high Poisson's ratio polymer thin film reversibly laminated to, or printed on, a single crystallizable polymer thin film or a multilayer polymer thin film.

During operation, proximate to input zone 630, clips 624, 626 may be affixed to respective edge portions of polymer thin film 605, where adjacent clips located on a given track 625, 627 may be disposed at an inter-clip spacing 651, 652, respectively. For simplicity, in the illustrated view, the inter-clip spacing 651 along the first track 625 within input zone 630 may be equivalent or substantially equivalent to the inter-clip spacing 652 along the second track 627 within input zone 630. As will be appreciated, in alternate embodiments, within input zone 630, the inter-clip spacing 651 along the first track 625 may be different than the inter-clip spacing 652 along the second track 627.

In addition to input zone 630 and output zone 638, system 600 may include one or more additional zones 632, 634, 636, etc., where each of: (i) the translation rate of the polymer thin film 605, (ii) the shape of first and second tracks 625, 627, (iii) the spacing between first and second tracks 625, 627, (iv) the inter-clip spacing 651-656, and (v) the local temperature of the polymer thin film 605, etc. may be independently controlled.

In an example process, as it is guided through system 600 by clips 624, 626, polymer thin film 605 may be heated to a selected temperature within each of zones 630, 632, 634, 636, 638. Fewer or a greater number of thermally controlled zones may be used. As illustrated, within zone 632, first and second tracks 625, 627 may diverge along a transverse direction such that polymer thin film 605 may be stretched in the transverse direction while being heated, for example, to a temperature greater than room temperature but less than the onset of melting. In some embodiments, a transverse stretch ratio (strain in the transverse direction/strain in the machine direction) may be approximately 6 or greater, e.g., 6, 8, 10, 15, 20, 25, or 30, including ranges between any of the foregoing values.

In accordance with certain embodiments, a polymer thin film may be stretched by a factor of 6 or more without fracture due at least in part to the high molecular weight of its component(s). In particular, high molecular weight polymers allow the thin film to be stretched at higher temperatures, which may decrease chain entanglement and produce a desirable combination of higher modulus, high transparency, and low haze in the stretched thin film.

Referring still to FIG. 6, within zone 632 the spacing 653 between adjacent first clips 624 on first track 625 and the spacing 654 between adjacent second clips 626 on second track 627 may decrease relative to the respective inter-clip spacing 651, 652 within input zone 630. In certain embodiments, the decrease in clip spacing 653, 654 from the initial spacings 651, 652 may scale approximately as the square root of the transverse stretch ratio. The actual ratio may depend on the Poisson's ratio of the polymer thin film as well as the requirements for the stretched thin film, including flatness, thickness, etc. Accordingly, in some embodiments, the in-plane axis of the polymer thin film that is perpendicular to the stretch direction may relax by an amount equal to the square root of the stretch ratio in the stretch direction.

By decreasing the clip spacings 653, 654 relative to inter-clip spacings 651, 652, the polymer thin film may be allowed to relax along the machine direction while being stretched along the transverse direction. For instance, the polymer thin film may relax along the machine direction by at least approximately 10% of the Poisson's ratio of the polymer, e.g., 10, 20, 30, 40, 50, 60, 70, or 80% of the Poisson's ratio of the polymer thin film, including ranges between any of the foregoing values.

A temperature of the polymer thin film may be controlled within each heating zone. Withing stretching zone 632, for example, a temperature of the polymer thin film 605 may be constant or independently controlled within sub-zones 665, 670, for example. In some embodiments, the temperature of the polymer thin film 605 may be decreased as the stretched polymer thin film 605 enters zone 634. Rapidly decreasing the temperature (i.e., thermal quenching) following the act of stretching within zone 632 may enhance the conformability of the polymer thin film 605. In some embodiments, the polymer thin film 605 may be thermally stabilized, where the temperature of the polymer thin film 605 may be controlled within each of the post-stretch zones 634, 636, 638. A temperature of the polymer thin film may be controlled by forced thermal convection or by radiation, for example, IR radiation, or a combination thereof.

Downstream of stretching zone 632, according to some embodiments, a transverse distance between first track 625 and second track 627 may remain constant or, as illustrated, initially decrease (e.g., within zone 634 and zone 636) prior to assuming a constant separation distance (e.g., within output zone 638). In a related vein, the inter-clip spacing downstream of stretching zone 632 may increase or decrease relative to inter-clip spacing 653 along first track 625 and inter-clip spacing 654 along second track 627. For example, inter-clip spacing 655 along first track 625 within output zone 638 may be less than inter-clip spacing 653 within stretching zone 632, and inter-clip spacing 656 along second track 627 within output zone 638 may be less than inter-clip spacing 654 within stretching zone 632. According to some embodiments, the spacing between the clips may be controlled by modifying the local velocity of the clips on a linear stepper motor line, or by using an attachment and variable clip-spacing mechanism connecting the clips to the corresponding track.

Figure 7:
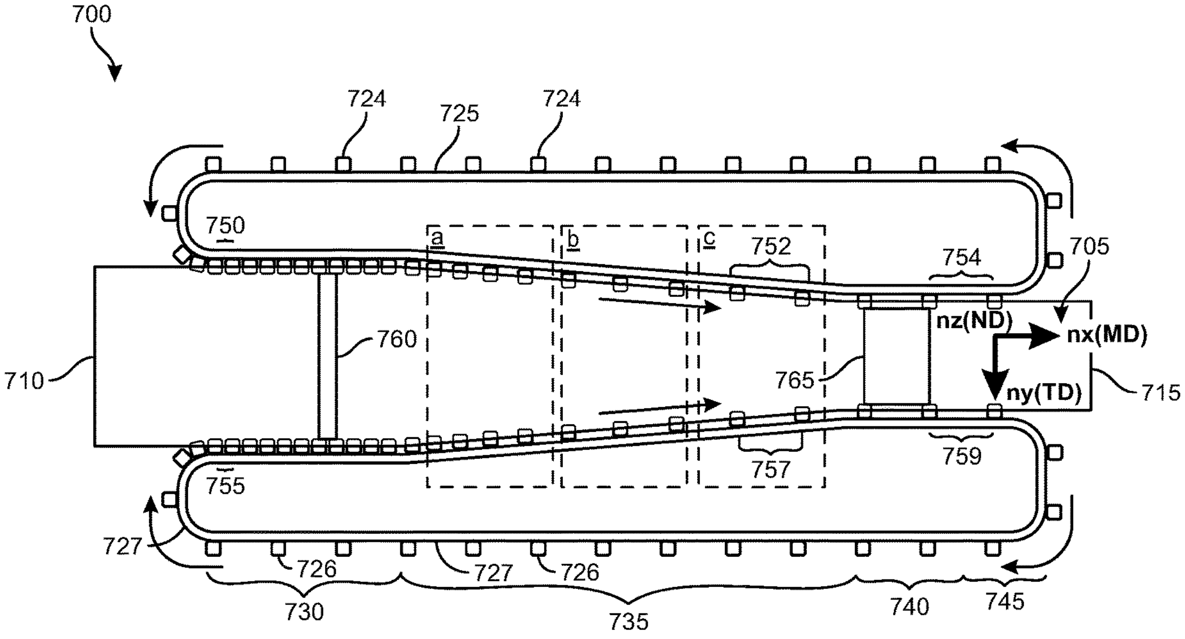
FIG. 7 is a schematic view of a thin film orientation system for manufacturing anisotropic piezoelectric polymer thin films according to further embodiments.

According to some embodiments, the stretched and oriented polymer thin film 615 may be removed from system 600 and further stretched in a subsequent stretching step, e.g., again using system 600, or via length orientation with relaxation as shown in FIG. 7. In example processes, a polymer thin film may be stretched one or more times, e.g., 1, 2, 3, 4, or 5 or more times.

Referring to FIG. 7, shown is a further example system for forming an anisotropic polymer thin film. Thin film orientation system 700 may include a thin film input zone 730 for receiving and pre-heating a crystalline or crystallizable portion 710 of a polymer thin film 705, a thin film output zone 745 for outputting an at least partially crystallized and oriented portion 715 of the polymer thin film 705, and a clip array 720 extending between the input zone 730 and the output zone 745 that is configured to grip and guide the polymer thin film 705 through the system 700. As in the previous embodiment, clip array 720 may include a plurality of first clips 724 that are slidably disposed on a first track 725 and a plurality of second clips 726 that are slidably disposed on a second track 727. In certain embodiments, crystalline or crystallizable portion 710 may correspond to stretched and oriented polymer thin film 615.

In an example process, proximate to input zone 730, first and second clips 724, 726 may be affixed to edge portions of polymer thin film 705, where adjacent clips located on a given track 725, 727 may be disposed at an initial inter-clip spacing 750, 755, which may be substantially constant or variable along both tracks within input zone 730. Within input zone 730 a distance along the transverse direction between first track 725 and second track 727 may be constant or substantially constant.

System 700 may additionally include one or more zones 735, 740, etc. The dynamics of system 700 allow independent control over: (i) the translation rate of the polymer thin film 705, (ii) the shape of first and second tracks 725, 727, (iii) the spacing between first and second tracks 725, 727 along the transverse direction, (iv) the inter-clip spacing 750, 755 within input zone 730 as well as downstream of the input zone (e.g., inter-clip spacings 752, 754, 757, 729), and (v) the local temperature of the polymer thin film, etc.

In an example process, as it is guided through system 700 by clips 724, 726, polymer thin film 705 may be heated to a selected temperature within each of zones 730, 735, 740, 745. A temperature greater than the glass transition temperature of a component of the polymer thin film 705 may be used during deformation (i.e., within zone 735), whereas a lesser temperature, an equivalent temperature, or a greater temperature may be used within each of one or more downstream zones.

As in the previous embodiment, the temperature of the polymer thin film 705 within stretching zone 735 may be locally controlled. According to some embodiments, the temperature of the polymer thin film 705 may be maintained at a constant or substantially constant value during the act of stretching. According to further embodiments, the temperature of the polymer thin film 705 may be incrementally increased within stretching zone 735. That is, the temperature of the polymer thin film 705 may be increased within stretching zone 735 as it advances along the machine direction. By way of example, the temperature of the polymer thin film 705 within stretching zone 735 may be locally controlled within each of heating zones a, b, and c.

The temperature profile may be continuous, discontinuous, or combinations thereof. As illustrated in FIG. 7, heating zones a, b, and c may extend across the width of the polymer thin film 705, and the temperature within each zone may be independently controlled according to the relationship room temperature $<T_a<T_b<T_c<T_m$. A temperature difference between neighboring heating zones may be less than approximately 20° C., e.g., less than approximately 10° C., or less than approximately 5° C.

Referring still to FIG. 7, within zone 735 the spacing 752 between adjacent first clips 724 on first track 725 and the spacing 757 between adjacent second clips 726 on second track 727 may increase relative to respective inter-clip spacings 750, 755 within input zone 730, which may apply an in-plane tensile stress to the polymer thin film 705 and stretch the polymer thin film along the machine direction. The extent of inter-clip spacing on one or both tracks 725, 727 within deformation zone 735 may be constant or variable and, for example, increase as a function of position along the machine direction.

Within stretching zone 735, the inner-clip spacings 752, 757 may increase linearly such that the primary mode of deformation may be at constant velocity. For example, a strain rate of the polymer thin film may decrease along the machine direction. In further embodiments, the polymer thin film 705 may be stretched at a constant strain rate where the inter-clip spacing may increase exponentially.

In certain examples, a progressively decreasing strain rate may be implemented. For instance, within stretching zone 735 an inter-clip spacing may be configured such that a distance between each successive pair of clips 724, 726 increases along the machine direction. The inter-clip spacing between each successive pair of clips may be independently controlled to achieve a desired strain rate along the machine direction.

In response to the tensile stress applied along the machine direction, first and second tracks 725, 727 may converge along a transverse direction within zone 735 such that polymer thin film 705 may relax in the transverse direction while being stretched in the machine direction. Using a single stretching step or multiple stretching steps, polymer thin film 705 may be stretched by a factor of at least approximately 4 (e.g., 4, 5, 6, 7, 8, 9, 10, 20, 40, 100, or more, including ranges between any of the foregoing values).

Within stretching zone 735, an angle of inclination of first and second tracks 725, 727 (i.e., with respect to the machine direction) may be constant or variable. In particular examples, the inclination angle within stretching zone 735 may decrease along the machine direction. That is, according to certain embodiments, the inclination angle within heating zone a may be greater than the inclination angle within heating zone b, and the inclination angle within heating zone b may be greater than the inclination angle within heating zone c. Such a configuration may be used to provide a progressive decrease in the relaxation rate (along the transverse direction) within the stretching zone 735 as the polymer thin film advances through system 700.

In some embodiments, the temperature of the polymer thin film 705 may be decreased as the stretched polymer thin film 705 exits zone 735. In some embodiments, the polymer thin film 705 may be thermally stabilized, where the temperature of the polymer thin film 705 may be controlled within each of the post-deformation zones 740, 745. A temperature of the polymer thin film may be controlled by forced thermal convection or by radiation, for example, IR radiation, or a combination thereof.

Downstream of deformation zone 735, the inter-clip spacing may increase or remain substantially constant relative to inter-clip spacing 752 along first track 725 and inter-clip spacing 757 along second track 727. For example, inter-clip spacing 754 along first track 725 within output zone 745 may be substantially equal to the inter-clip spacing 752 as the clips exit zone 735, and inter-clip spacing 759 along second track 727 within output zone 745 may be substantially equal to the inter-clip spacing 757 as the clips exit zone 735. Following the act of stretching, polymer thin film 705 may be annealed, for example, within one or more downstream zones 740, 745.

The strain impact of the thin film orientation system 700 is shown schematically by unit segments 760, 765, which respectively illustrate pre- and post-deformation dimensions for a selected area of polymer thin film 705. In the illustrated embodiment, polymer thin film 705 has a pre-stretch width (e.g., along the transverse direction) and a pre-stretch length (e.g., along the machine direction). As will be appreciated, a post-stretch width may be less than the pre-stretch width and a post-stretch length may be greater than the pre-stretch length.

A further stretching apparatus and method are illustrated and described with reference to FIG. 8. In the illustrated embodiment of FIG. 8, the apparatus includes an input region 830 where a thin film 840 is introduced into the stretching apparatus. Generally, the thin film 840 is presented in region 830 to one or more gripping members that are configured and arranged to hold opposing edges of the film and convey the film along opposing tracks 864 defining predetermined paths.

The gripping members (not separately shown) typically hold the film at or near the edges of the film. The portions of the film held by the gripping members may be unsuitable for use after stretching so the position of the gripping members may be selected to provide sufficient grip on the film to permit stretching while controlling the amount of waste material generated by the process. Gripping members, such as clips, can be directed along the track by, for example, rollers 862 rotating a belt along the track with the gripping members coupled to the belt.

The rollers may be connected to a driver mechanism that controls the speed and direction of the thin film as it is conveyed through the stretching apparatus. Rollers can also be used to rotate and control the speed of belt-type gripping members.

The apparatus may include a preconditioning region 832 that typically is enclosed by an oven 854 or other apparatus or arrangement to heat the thin film prior to stretching. The preconditioning region can include a preheating zone 842, a heat soak zone 844, or both.

In at least some embodiments, there may be a small amount of stretching that occurs in order to set the contact between the gripping members and the thin film. In at least some instances, there may not be any stretching but the increase in separation between the opposing tracks may account, at least in part, for thermal expansion of the thin film as the thin film is heated.

The thin film may be stretched in the primary stretching region 834. Typically, within the primary stretching region 834 the thin film is heated or maintained in a heated environment above the glass transition of the polymer(s) of the film. Examples of suitable heating elements include convective and radiative heating elements, although other heating elements may also be used. In some embodiments, the heating elements used to heat the thin film can be controlled individually or in groups to provide a variable amount of heat. Such control can be maintained by a variety of processes including variability in the temperature of the heating elements or in the direction or speed of air directed from the heating element to the thin film.

Control of the heating elements can be used, if desired, to variably heat regions of the thin film to improve or otherwise alter uniformity of stretching across the thin film. For example, areas of the thin film that do not stretch as much as other areas under uniform heating may be heated more to allow easier stretching.

Within the primary stretching region 834, the gripping members may follow generally diverging tracks to stretch the polymer thin film by a desired amount. The tracks in the primary stretching region and in other regions of the apparatus can be formed using a variety of structures and materials. Outside of the primary stretching region, the tracks may be substantially linear. The opposing linear tracks can be parallel or can be arranged to be converging or diverging.

Within the primary stretching region, the tracks are generally diverging and are generally curvilinear. In at least some embodiments, the tracks in the primary stretching region may be coupled to, but separable from, the tracks of the preceding regions. The tracks 866 in the succeeding post-conditioning or removal regions are typically separated from the tracks of the primary stretching region.

The apparatus typically may also include a post-conditioning region 836. For example, upon exiting stretch zone 846, the thin film may be set in zone 848 and quenched in zone 850. In some embodiments, quenching may be performed outside the stretching apparatus. Typically, the thin film may be set when at least one component of the film, e.g., one layer type in a multilayer thin film, reaches a temperature below the glass transition temperature. The thin film is quenched when all components reach a temperature level below their glass transition-temperatures.

Figure 8:
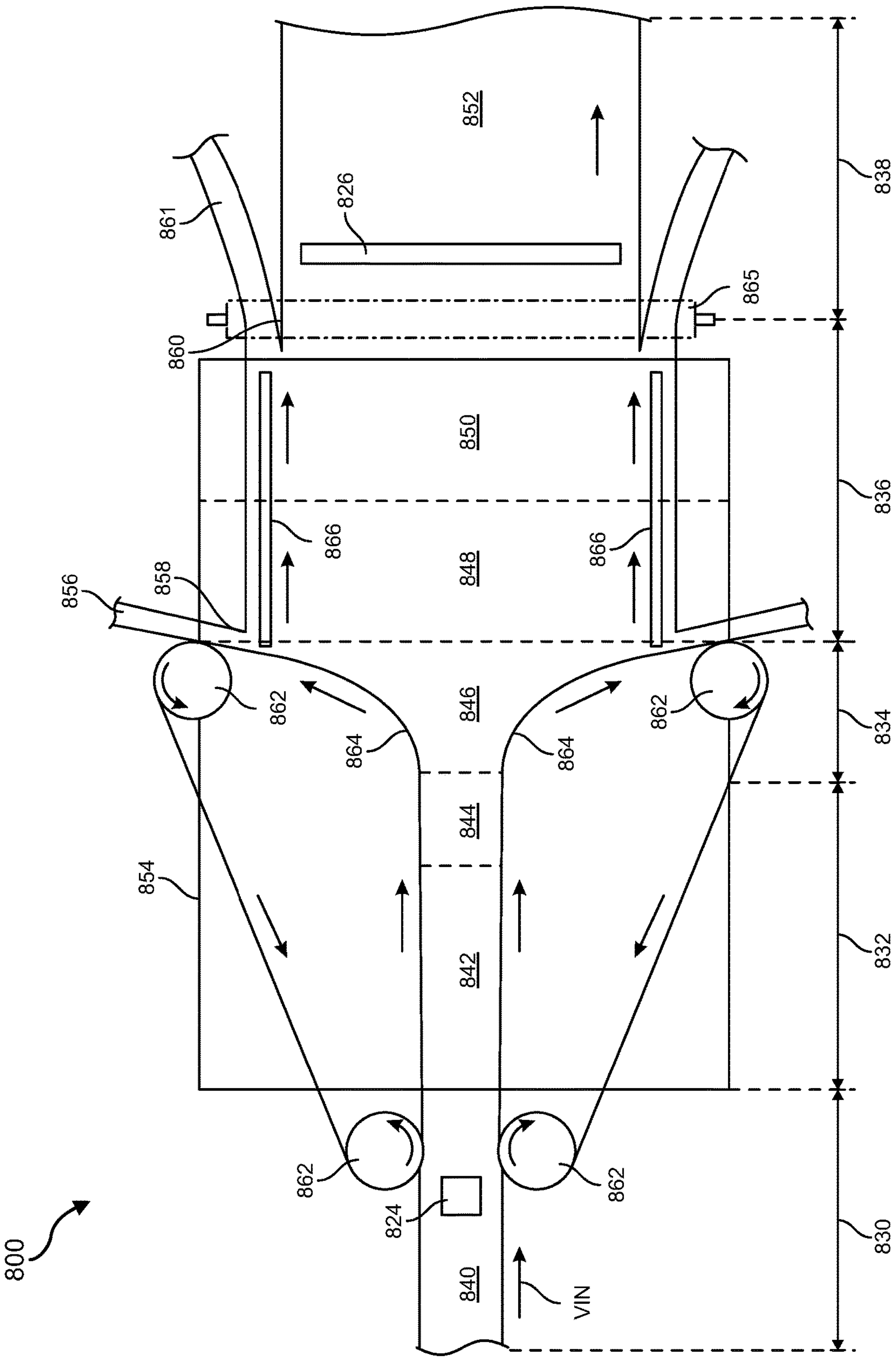
FIG. 8 is a schematic view of a thin film orientation system for manufacturing anisotropic piezoelectric polymer thin films according to still further embodiments.

In the embodiment illustrated in FIG. 8, a takeaway system is used to remove the thin film from the primary stretching region 834. In the illustrated embodiment, this takeaway system may be independent of (i.e., not directly connected to) the tracks upon which the film was conveyed through the primary stretching region. The takeaway system can use any film conveyance structures such as tracks 866 with gripping members such as, for example, opposing sets of belts or tenter clips.

Typically, the portions of the thin film that were held by the gripping members through the primary stretching region are removed. To maintain a substantially uniaxial draw throughout substantially all of the draw history, at the end of the transverse stretch, the rapidly diverging edge portions 856 may be severed from the stretched film at a slitting point 858. A cut can be made at 858 and flash or unusable portions 856 can be discarded.

The process and apparatus may also include a removal portion in region 838. Optionally a roller 865 may be used to advance the thin film. Preferably the roller 865 is not used as it would contact the stretched film 852 with the attendant potential to damage the stretched film. Another cut 860 may be made and unused portion 861 may be discarded. The thin film leaving the take-away system is typically wound on rolls for later use or processing. As shown schematically in FIG. 8, the apparatus and accompanying method may stretch a thin film from an initial configuration 824 to a final configuration 826.

In some embodiments, a roll-to-roll system may be integrated with a thin film orientation system, such as thin film orientation system 600 thin film orientation system 700, or thin film orientation system 800, to manipulate a polymer thin film. In further embodiments, a roll-to-roll system may itself be configured as a thin film orientation system.

As used herein, the terminology "engineering stress" may refer to a value equal to a force applied to a thin film divided by the thin film's initial cross-sectional area, whereas the terminology "real stress" may refer to an applied force divided by a dynamic cross-sectional area, i.e., an area determined during the act of stretching. To simplify the real stress calculation, the "real stress" reported herein is calculated as the quotient of the applied force and final cross-sectional area of a thin film, i.e., following the act of stretching.

5: Electric Poling

Electric poling may be applied to a PVDF thin film or fiber to improve piezoelectric performance. In some cases, poling can be applied after the film/fiber is extruded/calendered and/or stretched. In other cases, poling can be applied during an act of extrusion/calendering, stretching and/or annealing. As will be appreciated, piezoelectric performance may be attributed to aligned beta phase crystals. A low poling voltage may be applied to align beta phase crystals. A high poling voltage may be applied to induce a phase transformation from the alpha phase to the beta phase and to align beta phase crystals.

6: Thin Film Formation from Fibers

According to some embodiments, piezoelectric fibers may be processed further to form a thin film. A thin film may be formed by weaving or knitting fibers, for example, and crosslinking the fibers within a cross-linkable resin. In some cases, a thin film may be formed by laminating plural fibers within a polymer melt.

Disclosed are PVDF family member polymer thin films and fibers having improved electromechanical performance. Polymer-based piezoelectric thin films and fibers may be incorporated into active optical devices and dynamic mechanical systems, including anisotropic piezoelectric substrates, birefringent substrates, high Poisson's ratio thin films, reflective polarizers, birefringent mirrors, and the like, and may be used to manufacture AR/VR combiners or to provide display brightness enhancement, for example.

In this context, the electromechanical efficiency of a polymer material may be related to its piezoelectric coefficient and elastic modulus, and in thin film and fibrous polymer systems both the piezoelectric coefficient and the modulus may be increased by increasing the stretch ratio of the article. However, polymer entanglement may limit the stretch ratio. In view of the foregoing, a method is disclosed for forming disentangled PVDF family member polymers from which thin films and fibers may be formed by solid state extrusion or calendering followed by stretching, annealing, and electric poling.

According to particular embodiments, a non-equilibrium (disentangled) phase may be synthesized by a controlled radical polymerization process. In this process, a disentangled state may be achieved by controlling the reaction conditions such that the crystallization rate is greater than the polymerization reaction rate. Whereas comparative polymerization reactions may be characterized by high mobility polymer chains that lead to an entangled state, Applicants have shown that PVDF crystals may be formed during the polymerization such that nascent polymer chains are fixed, i.e., immobilized, within the crystalline network, which decreases the propensity for polymer entanglement. During such a work-up, one or more of monomer concentration, solvent selection, reaction temperature, initiator selection, catalyst selection, reaction time, etc., may be controlled. Example polymers may include PVDF and its copolymers such as PVDF-TrFE.

EXAMPLE EMBODIMENTS

Example 1: A polymer article has a polymer matrix that includes an at least partially disentangled polyvinylidene fluoride family polymer, where the polymer matrix has an elastic modulus of at least approximately 4 GPa and an electromechanical coupling factor ($k_{31}$) of at least approximately 0.1 at 25° C.

Example 2: The polymer article of Example 1, where the polyvinylidene fluoride family polymer comprises a moiety selected from vinylidene fluoride (VDF), trifluoroethylene (TrFE), chlorotrifluoroethylene (CTFE), hexafluoropropene (HFP), vinyl fluoride (VF), and homopolymers, copolymers, tri-polymers, derivatives and mixtures thereof.

Example 3: The polymer article of any of Examples 1 and 2, where the polyvinylidene fluoride family polymer has a weight average molecular weight ($M_w$) of at least approximately 100,000 g/mol.

Example 4: The polymer article of any of Examples 1-3, where the elastic modulus is at least approximately 4 GPa along each of a pair of mutually orthogonal dimensions of the polymer matrix.

Example 5: The polymer article of any of Examples 1-4, where the electromechanical coupling factor ($k_{31}$) is at least approximately 0.2 at 25° C.

Example 6: The polymer article of any of Examples 1-5, where a piezoelectric coefficient ($d_{31}$) of the polymer matrix is at least approximately 5 pC/N.

Example 7: The polymer article of any of Examples 1-6, where the polymer matrix has at least approximately 80% transparency at 550 nm and less than approximately 10% bulk haze.

Example 8: The polymer article of any of Examples 1-7, where the polymer matrix includes at least approximately 40% total crystalline content.

Example 9: The polymer article of any of Examples 1-8, where the polymer matrix includes at least approximately 30% total beta phase content.

Example 10: A polymer article includes an at least partially disentangled PVDF family polymer-containing matrix, an elastic modulus along at least one dimension of at least approximately 4 GPa, an electromechanical coupling factor ($k_{31}$) of at least approximately 0.1 at 25° C., and optical transparency along a thickness dimension of at least approximately 80%.

Example 11: The polymer article of Example 10, where the polymer article includes a thin film or a fiber.

Example 12: The polymer article of any of Examples 10 and 11, including at least approximately 30% total beta phase content.

Example 13: A method includes forming an at least partially disentangled PVDF family polymer composition into a polymer article, applying a tensile stress to the polymer article in an amount effective to induce a stretch ratio of at least approximately 5 in the polymer article, and applying an electric field across a thickness dimension of the polymer article.

Example 14: The method of Example 13, where forming the polymer article includes solid state extrusion or calendaring.

Example 15: The method of any of Examples 13 and 14, including annealing the polymer article while applying the tensile stress.

Example 16: The method of any of Examples 13-15, including annealing the polymer article at a temperature of at least 10° C. less than a melting peak temperature of the polymer composition while applying the tensile stress.

Example 17: The method of any of Examples 13-16, including annealing the polymer article after applying the tensile stress.

Example 18: The method of any of Examples 13-17, where applying the tensile stress includes applying a uniaxial stress.

Example 19: The method of any of Examples 13-18, where the electric field is applied while applying the tensile stress or after applying the tensile stress.

Example 20: The method of any of Examples 13-19, where the electric field is applied while annealing the polymer article or after annealing the polymer article.

Embodiments of the present disclosure may include or be implemented in conjunction with various types of artificial-reality systems. Artificial reality is a form of reality that has been adjusted in some manner before presentation to a user, which may include, for example, a virtual reality, an augmented reality, a mixed reality, a hybrid reality, or some combination and/or derivative thereof. Artificial-reality content may include completely computer-generated content or computer-generated content combined with captured (e.g., real-world) content. The artificial-reality content may include video, audio, haptic feedback, or some combination thereof, any of which may be presented in a single channel or in multiple channels (such as stereo video that produces a three-dimensional (3D) effect to the viewer). Additionally, in some embodiments, artificial reality may also be associated with applications, products, accessories, services, or some combination thereof, that are used to, for example, create content in an artificial reality and/or are otherwise used in (e.g., to perform activities in) an artificial reality.

Artificial-reality systems may be implemented in a variety of different form factors and configurations. Some artificial-reality systems may be designed to work without near-eye displays (NEDs). Other artificial-reality systems may include an NED that also provides visibility into the real world (such as, e.g., augmented-reality system 900 in FIG. 9) or that visually immerses a user in an artificial reality (such as, e.g., virtual-reality system 1000 in FIG. 10). While some artificial-reality devices may be self-contained systems, other artificial-reality devices may communicate and/or coordinate with external devices to provide an artificial-reality experience to a user. Examples of such external devices include handheld controllers, mobile devices, desktop computers, devices worn by a user, devices worn by one or more other users, and/or any other suitable external system.

Figure 9:
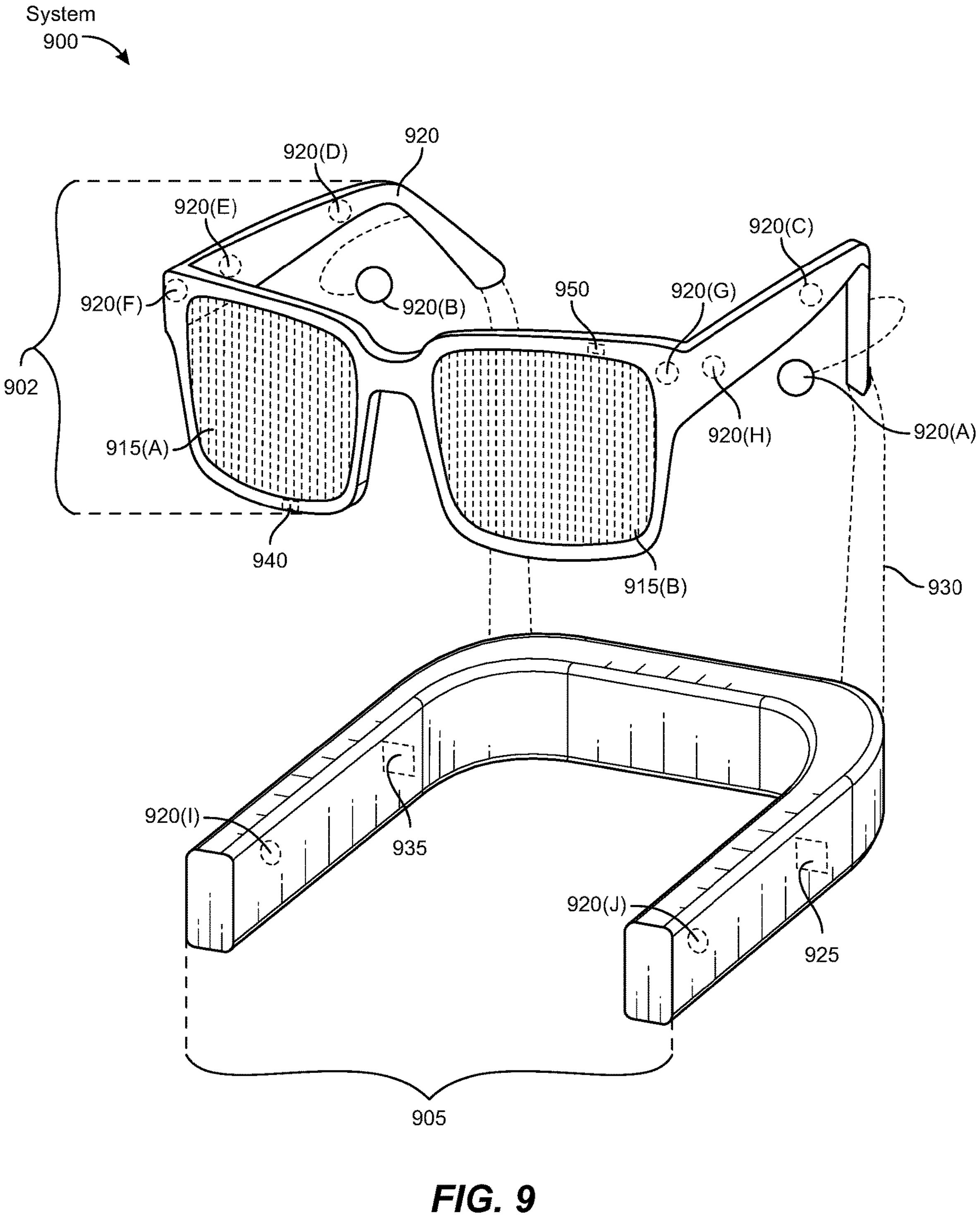
FIG. 9 is an illustration of exemplary augmented-reality glasses that may be used in connection with embodiments of this disclosure.
Figure 10:
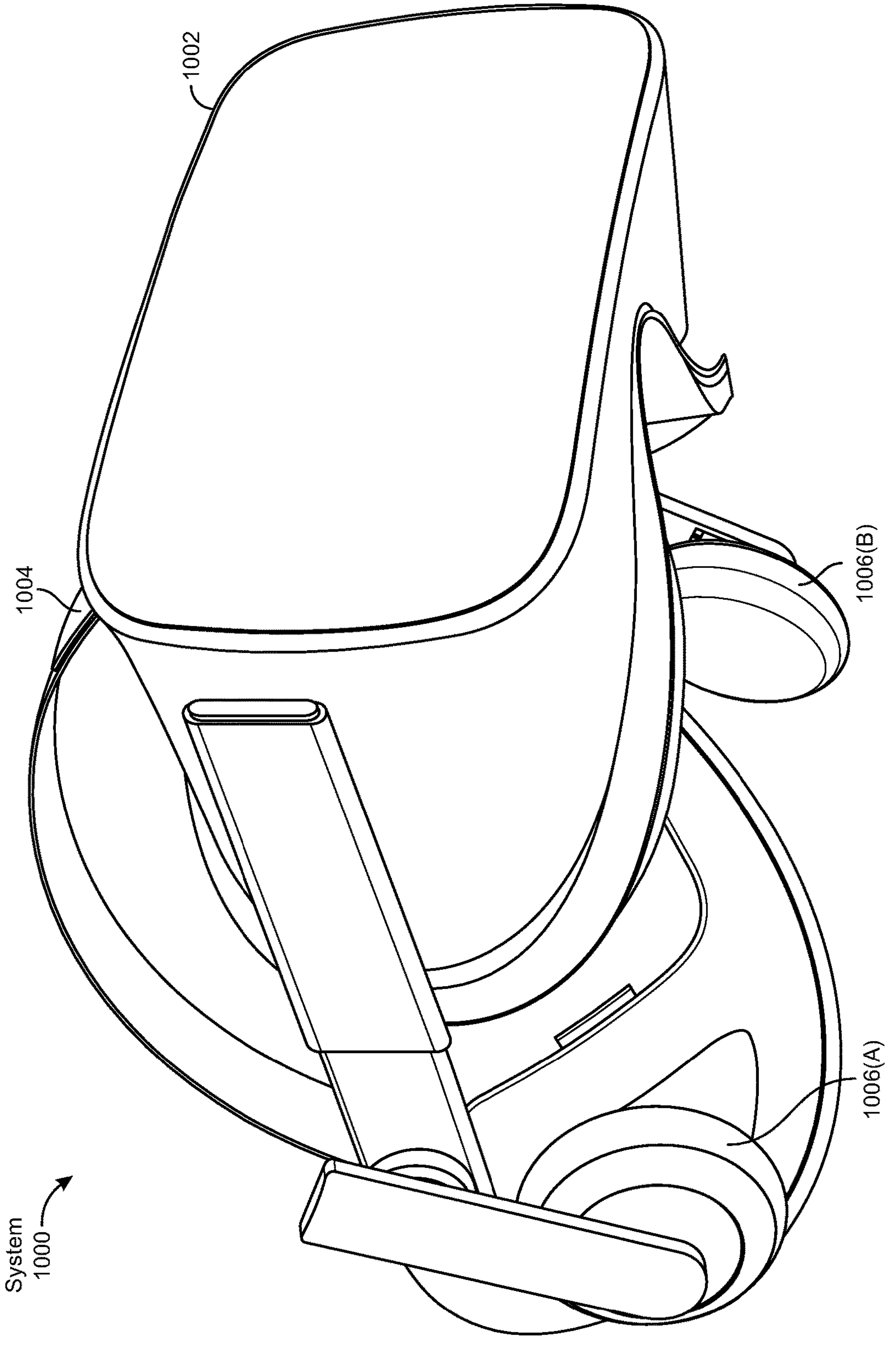
FIG. 10 is an illustration of an exemplary virtual-reality headset that may be used in connection with embodiments of this disclosure.

Turning to FIG. 9, augmented-reality system 900 may include an eyewear device 902 with a frame 910 configured to hold a left display device 915(A) and a right display device 915(B) in front of a user's eyes. Display devices 915(A) and 915(B) may act together or independently to present an image or series of images to a user. While augmented-reality system 900 includes two displays, embodiments of this disclosure may be implemented in augmented-reality systems with a single NED or more than two NEDs.

In some embodiments, augmented-reality system 900 may include one or more sensors, such as sensor 940. Sensor 940 may generate measurement signals in response to motion of augmented-reality system 900 and may be located on substantially any portion of frame 910. Sensor 940 may represent one or more of a variety of different sensing mechanisms, such as a position sensor, an inertial measurement unit (IMU), a depth camera assembly, a structured light emitter and/or detector, or any combination thereof. In some embodiments, augmented-reality system 900 may or may not include sensor 940 or may include more than one sensor. In embodiments in which sensor 940 includes an IMU, the IMU may generate calibration data based on measurement signals from sensor 940. Examples of sensor 940 may include, without limitation, accelerometers, gyroscopes, magnetometers, other suitable types of sensors that detect motion, sensors used for error correction of the IMU, or some combination thereof.

In some examples, augmented-reality system 900 may also include a microphone array with a plurality of acoustic transducers 920(A)-920(J), referred to collectively as acoustic transducers 920. Acoustic transducers 920 may represent transducers that detect air pressure variations induced by sound waves. Each acoustic transducer 920 may be configured to detect sound and convert the detected sound into an electronic format (e.g., an analog or digital format). The microphone array in FIG. 9 may include, for example, ten acoustic transducers: 920(A) and 920(B), which may be designed to be placed inside a corresponding ear of the user, acoustic transducers 920(C), 920(D), 920(E), 920(F), 920(G), and 920(H), which may be positioned at various locations on frame 910, and/or acoustic transducers 920(1) and 920(J), which may be positioned on a corresponding neckband 905.

In some embodiments, one or more of acoustic transducers 920(A)-(J) may be used as output transducers (e.g., speakers). For example, acoustic transducers 920(A) and/or 920(B) may be earbuds or any other suitable type of headphone or speaker.

The configuration of acoustic transducers 920 of the microphone array may vary. While augmented-reality system 900 is shown in FIG. 9 as having ten acoustic transducers 920, the number of acoustic transducers 920 may be greater or less than ten. In some embodiments, using higher numbers of acoustic transducers 920 may increase the amount of audio information collected and/or the sensitivity and accuracy of the audio information. In contrast, using a lower number of acoustic transducers 920 may decrease the computing power required by an associated controller 950 to process the collected audio information. In addition, the position of each acoustic transducer 920 of the microphone array may vary. For example, the position of an acoustic transducer 920 may include a defined position on the user, a defined coordinate on frame 910, an orientation associated with each acoustic transducer 920, or some combination thereof.

Acoustic transducers 920(A) and 920(B) may be positioned on different parts of the user's ear, such as behind the pinna, behind the tragus, and/or within the auricle or fossa. Or, there may be additional acoustic transducers 920 on or surrounding the ear in addition to acoustic transducers 920 inside the ear canal. Having an acoustic transducer 920 positioned next to an ear canal of a user may enable the microphone array to collect information on how sounds arrive at the ear canal. By positioning at least two of acoustic transducers 920 on either side of a user's head (e.g., as binaural microphones), augmented-reality device 900 may simulate binaural hearing and capture a 3D stereo sound field around about a user's head. In some embodiments, acoustic transducers 920(A) and 920(B) may be connected to augmented-reality system 900 via a wired connection 930, and in other embodiments acoustic transducers 920(A) and 920(B) may be connected to augmented-reality system 900 via a wireless connection (e.g., a BLUETOOTH connection). In still other embodiments, acoustic transducers 920(A) and 920(B) may not be used at all in conjunction with augmented-reality system 900.

Acoustic transducers 920 on frame 910 may be positioned in a variety of different ways, including along the length of the temples, across the bridge, above or below display devices 915(A) and 915(B), or some combination thereof. Acoustic transducers 920 may also be oriented such that the microphone array is able to detect sounds in a wide range of directions surrounding the user wearing the augmented-reality system 900. In some embodiments, an optimization process may be performed during manufacturing of augmented-reality system 900 to determine relative positioning of each acoustic transducer 920 in the microphone array.

In some examples, augmented-reality system 900 may include or be connected to an external device (e.g., a paired device), such as neckband 905. Neckband 905 generally represents any type or form of paired device. Thus, the following discussion of neckband 905 may also apply to various other paired devices, such as charging cases, smart watches, smart phones, wrist bands, other wearable devices, hand-held controllers, tablet computers, laptop computers, other external compute devices, etc.

As shown, neckband 905 may be coupled to eyewear device 902 via one or more connectors. The connectors may be wired or wireless and may include electrical and/or non-electrical (e.g., structural) components. In some cases, eyewear device 902 and neckband 905 may operate independently without any wired or wireless connection between them. While FIG. 9 illustrates the components of eyewear device 902 and neckband 905 in example locations on eyewear device 902 and neckband 905, the components may be located elsewhere and/or distributed differently on eyewear device 902 and/or neckband 905. In some embodiments, the components of eyewear device 902 and neckband 905 may be located on one or more additional peripheral devices paired with eyewear device 902, neckband 905, or some combination thereof.

Pairing external devices, such as neckband 905, with augmented-reality eyewear devices may enable the eyewear devices to achieve the form factor of a pair of glasses while still providing sufficient battery and computation power for expanded capabilities. Some or all of the battery power, computational resources, and/or additional features of augmented-reality system 900 may be provided by a paired device or shared between a paired device and an eyewear device, thus reducing the weight, heat profile, and form factor of the eyewear device overall while still retaining desired functionality. For example, neckband 905 may allow components that would otherwise be included on an eyewear device to be included in neckband 905 since users may tolerate a heavier weight load on their shoulders than they would tolerate on their heads. Neckband 905 may also have a larger surface area over which to diffuse and disperse heat to the ambient environment. Thus, neckband 905 may allow for greater battery and computation capacity than might otherwise have been possible on a stand-alone eyewear device. Since weight carried in neckband 905 may be less invasive to a user than weight carried in eyewear device 902, a user may tolerate wearing a lighter eyewear device and carrying or wearing the paired device for greater lengths of time than a user would tolerate wearing a heavy standalone eyewear device, thereby enabling users to more fully incorporate artificial-reality environments into their day-to-day activities.

Neckband 905 may be communicatively coupled with eyewear device 902 and/or to other devices. These other devices may provide certain functions (e.g., tracking, localizing, depth mapping, processing, storage, etc.) to augmented-reality system 900. In the embodiment of FIG. 9, neckband 905 may include two acoustic transducers (e.g., 920(I) and 920(J)) that are part of the microphone array (or potentially form their own microphone subarray). Neckband 905 may also include a controller 925 and a power source 935.

Acoustic transducers 920(1) and 920(J) of neckband 905 may be configured to detect sound and convert the detected sound into an electronic format (analog or digital). In the embodiment of FIG. 9, acoustic transducers 920(I) and 920(J) may be positioned on neckband 905, thereby increasing the distance between the neckband acoustic transducers 920(I) and 920(J) and other acoustic transducers 920 positioned on eyewear device 902. In some cases, increasing the distance between acoustic transducers 920 of the microphone array may improve the accuracy of beamforming performed via the microphone array. For example, if a sound is detected by acoustic transducers 920(C) and 920(D) and the distance between acoustic transducers 920(C) and 920 (D) is greater than, e.g., the distance between acoustic transducers 920(D) and 920(E), the determined source location of the detected sound may be more accurate than if the sound had been detected by acoustic transducers 920(D) and 920(E).

Controller 925 of neckband 905 may process information generated by the sensors on neckband 905 and/or augmented-reality system 900. For example, controller 925 may process information from the microphone array that describes sounds detected by the microphone array. For each detected sound, controller 925 may perform a direction-of-arrival (DOA) estimation to estimate a direction from which the detected sound arrived at the microphone array. As the microphone array detects sounds, controller 925 may populate an audio data set with the information. In embodiments in which augmented-reality system 900 includes an inertial measurement unit, controller 925 may compute all inertial and spatial calculations from the IMU located on eyewear device 902. A connector may convey information between augmented-reality system 900 and neckband 905 and between augmented-reality system 900 and controller 925. The information may be in the form of optical data, electrical data, wireless data, or any other transmittable data form. Moving the processing of information generated by augmented-reality system 900 to neckband 905 may reduce weight and heat in eyewear device 902, making it more comfortable to the user.

Power source 935 in neckband 905 may provide power to eyewear device 902 and/or to neckband 905. Power source 935 may include, without limitation, lithium ion batteries, lithium-polymer batteries, primary lithium batteries, alkaline batteries, or any other form of power storage. In some cases, power source 935 may be a wired power source. Including power source 935 on neckband 905 instead of on eyewear device 902 may help better distribute the weight and heat generated by power source 935.

As noted, some artificial-reality systems may, instead of blending an artificial reality with actual reality, substantially replace one or more of a user's sensory perceptions of the real world with a virtual experience. One example of this type of system is a head-worn display system, such as virtual-reality system 1000 in FIG. 10, that mostly or completely covers a user's field of view. Virtual-reality system 1000 may include a front rigid body 1002 and a band 1004 shaped to fit around a user's head. Virtual-reality system 1000 may also include output audio transducers 1006(A) and 1006(B). Furthermore, while not shown in FIG. 10, front rigid body 1002 may include one or more electronic elements, including one or more electronic displays, one or more inertial measurement units (IMUs), one or more tracking emitters or detectors, and/or any other suitable device or system for creating an artificial-reality experience.

Artificial-reality systems may include a variety of types of visual feedback mechanisms. For example, display devices in augmented-reality system 900 and/or virtual-reality system 1000 may include one or more liquid crystal displays (LCDs), light emitting diode (LED) displays, microLED displays, organic LED (OLED) displays, digital light project (DLP) micro-displays, liquid crystal on silicon (LCoS) micro-displays, and/or any other suitable type of display screen. These artificial-reality systems may include a single display screen for both eyes or may provide a display screen for each eye, which may allow for additional flexibility for varifocal adjustments or for correcting a user's refractive error. Some of these artificial-reality systems may also include optical subsystems having one or more lenses (e.g., concave or convex lenses, Fresnel lenses, adjustable liquid lenses, etc.) through which a user may view a display screen. These optical subsystems may serve a variety of purposes, including to collimate (e.g., make an object appear at a greater distance than its physical distance), to magnify (e.g., make an object appear larger than its actual size), and/or to relay (to, e.g., the viewer's eyes) light. These optical subsystems may be used in a non-pupil-forming architecture (such as a single lens configuration that directly collimates light but results in so-called pincushion distortion) and/or a pupil-forming architecture (such as a multi-lens configuration that produces so-called barrel distortion to nullify pincushion distortion).

In addition to or instead of using display screens, some of the artificial-reality systems described herein may include one or more projection systems. For example, display devices in augmented-reality system 900 and/or virtual-reality system 1000 may include micro-LED projectors that project light (using, e.g., a waveguide) into display devices, such as clear combiner lenses that allow ambient light to pass through. The display devices may refract the projected light toward a user's pupil and may enable a user to simultaneously view both artificial-reality content and the real world. The display devices may accomplish this using any of a variety of different optical components, including waveguide components (e.g., holographic, planar, diffractive, polarized, and/or reflective waveguide elements), light-manipulation surfaces and elements (such as diffractive, reflective, and refractive elements and gratings), coupling elements, etc. Artificial-reality systems may also be configured with any other suitable type or form of image projection system, such as retinal projectors used in virtual retina displays.

The artificial-reality systems described herein may also include various types of computer vision components and subsystems. For example, augmented-reality system 900 and/or virtual-reality system 1000 may include one or more optical sensors, such as two-dimensional (2D) or 3D cameras, structured light transmitters and detectors, time-of-flight depth sensors, single-beam or sweeping laser rangefinders, 3D LiDAR sensors, and/or any other suitable type or form of optical sensor. An artificial-reality system may process data from one or more of these sensors to identify a location of a user, to map the real world, to provide a user with context about real-world surroundings, and/or to perform a variety of other functions.

The artificial-reality systems described herein may also include one or more input and/or output audio transducers. Output audio transducers may include voice coil speakers, ribbon speakers, electrostatic speakers, piezoelectric speakers, bone conduction transducers, cartilage conduction transducers, tragus-vibration transducers, and/or any other suitable type or form of audio transducer. Similarly, input audio transducers may include condenser microphones, dynamic microphones, ribbon microphones, and/or any other type or form of input transducer. In some embodiments, a single transducer may be used for both audio input and audio output.

In some embodiments, the artificial-reality systems described herein may also include tactile (i.e., haptic) feedback systems, which may be incorporated into headwear, gloves, body suits, handheld controllers, environmental devices (e.g., chairs, floormats, etc.), and/or any other type of device or system. Haptic feedback systems may provide various types of cutaneous feedback, including vibration, force, traction, texture, and/or temperature. Haptic feedback systems may also provide various types of kinesthetic feedback, such as motion and compliance. Haptic feedback may be implemented using motors, piezoelectric actuators, fluidic systems, and/or a variety of other types of feedback mechanisms. Haptic feedback systems may be implemented independent of other artificial-reality devices, within other artificial-reality devices, and/or in conjunction with other artificial-reality devices.

By providing haptic sensations, audible content, and/or visual content, artificial-reality systems may create an entire virtual experience or enhance a user's real-world experience in a variety of contexts and environments. For instance, artificial-reality systems may assist or extend a user's perception, memory, or cognition within a particular environment. Some systems may enhance a user's interactions with other people in the real world or may enable more immersive interactions with other people in a virtual world. Artificial-reality systems may also be used for educational purposes (e.g., for teaching or training in schools, hospitals, government organizations, military organizations, business enterprises, etc.), entertainment purposes (e.g., for playing video games, listening to music, watching video content, etc.), and/or for accessibility purposes (e.g., as hearing aids, visual aids, etc.). The embodiments disclosed herein may enable or enhance a user's artificial-reality experience in one or more of these contexts and environments and/or in other contexts and environments.

The process parameters and sequence of the steps described and/or illustrated herein are given by way of example only and may be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

It will be understood that when an element such as a layer or a region is referred to as being formed on, deposited on, or disposed "on" or "over" another element, it may be located directly on at least a portion of the other element, or one or more intervening elements may also be present. In contrast, when an element is referred to as being "directly on" or "directly over" another element, it may be located on at least a portion of the other element, with no intervening elements present.

As used herein, the term "substantially" in reference to a given parameter, property, or condition may mean and include to a degree that one of ordinary skill in the art would understand that the given parameter, property, or condition is met with a small degree of variance, such as within acceptable manufacturing tolerances. By way of example, depending on the particular parameter, property, or condition that is substantially met, the parameter, property, or condition may be at least approximately 90% met, at least approximately 95% met, or even at least approximately 99% met.

As used herein, the term "approximately" in reference to a particular numeric value or range of values may, in certain embodiments, mean and include the stated value as well as all values within 10% of the stated value. Thus, by way of example, reference to the numeric value "50" as "approximately 50" may, in certain embodiments, include values equal to 50±5, i.e., values within the range 45 to 55.

While various features, elements or steps of particular embodiments may be disclosed using the transitional phrase "comprising," it is to be understood that alternative embodiments, including those that may be described using the transitional phrases "consisting of" or "consisting essentially of," are implied. Thus, for example, implied alternative embodiments to a polymer thin film that comprises or includes polyvinylidene fluoride include embodiments where a polymer thin film consists essentially of polyvinylidene fluoride and embodiments where a polymer thin film consists of polyvinylidene fluoride.

What is claimed is:

1. A polymer article comprising:

a polymer matrix including an at least partially disentangled polyvinylidene fluoride family polymer, wherein the polymer matrix has an elastic modulus of at least approximately 4 GPa and an electromechanical coupling factor ($k_{31}$) of at least approximately 0.1 at 25° C.

2. The polymer article of claim 1, wherein the at least partially disentangled polyvinylidene fluoride family polymer comprises a moiety selected from the group consisting of vinylidene fluoride (VDF), trifluoroethylene (TrFE), chlorotrifluoroethylene (CTFE), hexafluoropropene (HFP), vinyl fluoride (VF), and homopolymers, copolymers, tri-polymers, derivatives and mixtures thereof.

3. The polymer article of claim 1, wherein the at least partially disentangled polyvinylidene fluoride family polymer has a weight average molecular weight ($M_w$) of at least approximately 100,000 g/mol.

4. The polymer article of claim 1, wherein the elastic modulus is at least approximately 4 GPa along each of a pair of mutually orthogonal dimensions of the polymer matrix.

5. The polymer article of claim 1, wherein the electromechanical coupling factor ($k_{31}$) is at least approximately 0.2 at 25° C.

6. The polymer article of claim 1, wherein a piezoelectric coefficient ($d_{31}$) of the polymer matrix is at least approximately 5 pC/N.

7. The polymer article of claim 1, wherein the polymer matrix comprises at least approximately 80% transparency at 550 nm and less than approximately 10% bulk haze.

8. The polymer article of claim 1, wherein the polymer matrix comprises at least approximately 40% total crystalline content.

9. The polymer article of claim 1, wherein the polymer matrix comprises at least approximately 30% total beta phase content.

10. A polymer article comprising:

an at least partially disentangled PVDF family polymer-containing matrix;

an elastic modulus along at least one dimension of at least approximately 4 GPa;

an electromechanical coupling factor ($k_{31}$) of at least approximately 0.1 at 25° C.; and optical transparency along a thickness dimension of at least approximately 80%.

11. The polymer article of claim 10, wherein the polymer article comprises a thin film or a fiber.

12. The polymer article of claim 10, comprising at least approximately 30% total beta phase content.

* * * * *